United States Patent
Webb et al.

(10) Patent No.: US 6,437,829 B1
(45) Date of Patent: Aug. 20, 2002

(54) ALIGNMENT OF CATHODE RAY TUBE DISPLAYS USING A VIDEO GRAPHICS CONTROLLER

(75) Inventors: James R. Webb, Boulder; Ron C. Simpson, Erie, both of CO (US)

(73) Assignee: Display Laboratories, Inc., Boulder, CO (US)

( * ) Notice: Subject to any disclaimer, the term of this patent is extended or adjusted under 35 U.S.C. 154(b) by 0 days.

(21) Appl. No.: 08/936,675

(22) Filed: Sep. 24, 1997

Related U.S. Application Data

(60) Provisional application No. 60/038,771, filed on Jan. 16, 1997.

(51) Int. Cl.⁷ .................................................. H04N 7/08
(52) U.S. Cl. ........................ 348/476; 348/806; 348/460
(58) Field of Search ................................. 348/189, 184, 348/190, 460, 461, 473, 474, 476, 745, 806, 807, 552

(56) References Cited

U.S. PATENT DOCUMENTS

| | | | |
|---|---|---|---|
| 3,702,949 A | 11/1972 | Kolb | |
| 3,814,981 A | 6/1974 | Rusk | |
| 3,944,884 A | 3/1976 | Wilocki | 315/400 |
| 3,961,223 A | 6/1976 | Ray et al. | |
| 3,995,269 A | 11/1976 | Schumacher | |
| 4,000,510 A | * 12/1976 | Cheney et al. | 360/33 |
| 4,058,826 A | 11/1977 | Schneider | 358/10 |
| 4,139,799 A | 2/1979 | Kureha et al. | 315/13 C |
| 4,201,932 A | 5/1980 | Smith | 315/13 C |
| 4,217,574 A | * 8/1980 | Anderson | 348/674 |
| 4,281,340 A | 7/1981 | Mitamura et al. | 358/67 |
| 4,314,179 A | 2/1982 | Tooyama et al. | 358/69 |
| 4,385,259 A | 5/1983 | Chase et al. | 315/368 |
| 4,409,523 A | 10/1983 | Yasumura | 315/371 |
| 4,501,995 A | 2/1985 | Olmstead et al. | 315/371 |
| 4,506,292 A | 3/1985 | Newton et al. | 358/10 |

(List continued on next page.)

FOREIGN PATENT DOCUMENTS

| | | |
|---|---|---|
| EP | 0 404 700 A1 | 12/1990 |
| EP | 0 448 267 A2 | 9/1991 |
| JP | 61-257096 | 11/1986 |
| JP | 1-204594 | 8/1989 |
| JP | 1-204595 | 8/1989 |
| JP | 3-99376 | 4/1991 |
| JP | 06303624 A | 10/1994 |
| JP | 08088860 A | 4/1996 |
| JP | 08182013 A | 7/1996 |

OTHER PUBLICATIONS

Display Laboratories, Inc. Technical Data, Advanced Information, DLAB494.
Display Laboratories, Inc. Technical Data, Advanced Information, DLAB520A.
Display Laboratories, Inc., Automated Monitor Alignment & Inspection System MIMiCAM™.
Display Laboratories, Inc., Technical Data, Advanced Information, High–Voltage Regulator, DLAB43A.
Display Laboratories, Inc., Technical Data, Advanced Information, High–Voltage Horizontal Controller, DLAB62A.

(List continued on next page.)

*Primary Examiner*—David E. Harvey
(74) *Attorney, Agent, or Firm*—Merchant & Gould P.C.

(57) ABSTRACT

Dynamic adjustment techniques for aligning video images in cathode ray tube (CRT) devices are disclosed. A host computer stores correction factor data and video image data in video graphics controller RAM. The host computer processes and transmits the correction factor data, representative of the cathode ray tube distortion characteristics, to the CRT device during the retrace time of the electron beam and video image data during the trace time. The correction factor data may be generated by a vision system, a gain matrix table, interpolation engine or manual methods. Circuitry, within the CRT device, for separating the correction factor data from the video signal is disclosed along with the methods and apparatus used to decode correction data. Data can also be transferred from the monitor back to the host computer over the video connector.

7 Claims, 16 Drawing Sheets

U.S. PATENT DOCUMENTS

| | | | |
|---|---|---|---|
| 4,518,898 A | 5/1985 | Tarnowski et al. | 315/371 |
| 4,523,188 A | 6/1985 | Huber | 340/734 |
| 4,547,708 A | 10/1985 | Haferl | 315/371 |
| 4,549,117 A | 10/1985 | Takahashi et al. | 315/371 |
| 4,551,657 A | 11/1985 | Miller et al. | 315/399 |
| 4,555,649 A | 11/1985 | Sharma | 315/382 |
| 4,588,929 A | 5/1986 | Wedam et al. | 315/395 |
| 4,612,482 A | 9/1986 | Beamon, III et al. | 315/371 |
| 4,617,495 A | 10/1986 | Culter | 315/10 |
| 4,620,136 A | 10/1986 | Bolger | 315/371 |
| 4,625,154 A | 11/1986 | Willis | 315/371 |
| 4,631,576 A | 12/1986 | St. John | 358/65 |
| 4,634,937 A | 1/1987 | Haferl | 315/371 |
| 4,641,062 A | 2/1987 | Pons | 315/368 |
| 4,649,324 A | 3/1987 | Guerra et al. | 315/370 |
| 4,649,421 A | 3/1987 | Kodama et al. | 358/51 |
| 4,654,706 A | 3/1987 | Davidson et al. | 358/139 |
| 4,672,275 A | 6/1987 | Ando | 315/368 |
| 4,695,772 A | 9/1987 | Lau et al. | 315/370 |
| 4,754,204 A | 6/1988 | Ando et al. | 315/367 |
| 4,757,239 A | 7/1988 | Starkey, IV | 315/371 |
| 4,764,709 A | 8/1988 | Oliver | 315/370 |
| 4,766,354 A | 8/1988 | Oliver | |
| 4,772,948 A | 9/1988 | Irvin | 358/139 |
| 4,777,411 A | 10/1988 | O'Connor et al. | 315/371 |
| 4,789,811 A | 12/1988 | Hulshof | |
| 4,795,946 A | 1/1989 | Nishiyama | 315/370 |
| 4,799,000 A | 1/1989 | Close | 315/371 |
| 4,810,939 A | 3/1989 | Watanabe et al. | |
| 4,816,908 A | 3/1989 | Colineau et al. | |
| 4,817,038 A | 3/1989 | Knoll et al. | |
| 4,818,919 A | 4/1989 | Kobayashi et al. | |
| 4,857,998 A | 8/1989 | Tsujihara et al. | |
| 4,859,915 A | 8/1989 | Decraemer | |
| 4,872,060 A | 10/1989 | Micic et al. | |
| 4,887,011 A | 12/1989 | Haynie et al. | |
| 4,896,081 A | 1/1990 | Ichigaya et al. | |
| 4,896,082 A | 1/1990 | Geiger | |
| 4,897,721 A | 1/1990 | Young et al. | |
| 4,952,851 A | 8/1990 | Macaulay | |
| 4,963,828 A | 10/1990 | Kawame et al. | |
| 4,989,072 A | 1/1991 | Sato et al. | |
| 4,994,912 A * | 2/1991 | Lumelsky et al. | 348/552 |
| 5,020,116 A | 5/1991 | Macaulay | |
| 5,034,667 A | 7/1991 | Lendaro | |
| 5,036,251 A | 7/1991 | Lee | |
| 5,059,979 A | 10/1991 | Micic et al. | |
| 5,081,523 A | 1/1992 | Frazier | |
| 5,111,110 A | 5/1992 | Houben | |
| 5,113,122 A | 5/1992 | Bando et al. | 315/371 |
| 5,115,171 A | 5/1992 | Haferl | |
| 5,155,417 A | 10/1992 | Tateishi | |
| 5,159,436 A | 10/1992 | Soneira | |
| 5,164,639 A | 11/1992 | Shimaoka et al. | |
| 5,194,784 A | 3/1993 | Tripod | |
| 5,214,499 A | 5/1993 | Gleim et al. | |
| 5,216,504 A | 6/1993 | Webb et al. | |
| 5,220,251 A | 6/1993 | Gawell et al. | |
| 5,231,481 A | 7/1993 | Eouzan et al. | |
| 5,237,246 A | 8/1993 | Gleim et al. | |
| 5,257,096 A | 10/1993 | Oshima | |
| 5,258,843 A * | 11/1993 | Truong | 348/586 |
| 5,260,628 A | 11/1993 | Kawaberi et al. | |
| 5,276,458 A | 1/1994 | Sawdon | |
| 5,294,866 A | 3/1994 | Miyazaki et al. | |
| 5,327,156 A | 7/1994 | Masukane et al. | 345/113 |
| 5,345,262 A | 9/1994 | Yee et al. | |
| 5,355,058 A | 10/1994 | Jackson et al. | |
| 5,369,499 A | 11/1994 | Yip | |
| 5,398,083 A | 3/1995 | Tsujihara et al. | 348/807 |
| 5,399,945 A | 3/1995 | Haferl | |
| 5,402,044 A | 3/1995 | Haferl | |
| 5,420,483 A | 5/1995 | Suzuki et al. | |
| 5,420,645 A | 5/1995 | Traa et al. | |
| 5,432,548 A | 7/1995 | Byen et al. | |
| 5,434,483 A | 7/1995 | Yang et al. | |
| 5,434,484 A | 7/1995 | Murakami | |
| 5,434,595 A | 7/1995 | Macaulay | |
| 5,436,677 A | 7/1995 | Suzuki et al. | |
| 5,440,340 A | 8/1995 | Tsurutani et al. | |
| 5,450,542 A | 9/1995 | Lehman et al. | 395/162 |
| 5,457,473 A | 10/1995 | Arai et al. | 345/10 |
| 5,463,427 A | 10/1995 | Kawashima | |
| 5,499,050 A * | 3/1996 | Baldes et al. | 348/180 |
| 5,504,521 A | 4/1996 | Webb et al. | |
| 5,506,481 A | 4/1996 | Wada et al. | |
| 5,510,833 A | 4/1996 | Webb et al. | |
| 5,512,964 A | 4/1996 | Kim | |
| 5,528,112 A | 6/1996 | George et al. | |
| 5,532,755 A * | 7/1996 | Patel et al. | 348/614 |
| 5,532,764 A | 7/1996 | Itaki | |
| 5,537,159 A | 7/1996 | Suematsu et al. | |
| 5,592,240 A | 1/1997 | Sakamoto et al. | |
| 5,654,743 A * | 8/1997 | Hu et al. | 348/473 |
| 5,742,350 A * | 4/1998 | Pan et al. | 348/453 |
| 5,760,838 A * | 6/1998 | Adams et al. | 348/460 |
| 5,828,351 A * | 10/1998 | Wu | 348/678 |
| 5,850,265 A * | 12/1998 | Suh | 348/553 |
| 5,907,368 A * | 5/1999 | Nakamura et al. | 348/520 |
| 5,973,681 A * | 10/1999 | Tanigawa et al. | 348/473 |
| 5,986,676 A * | 11/1999 | Dwin et al. | 348/739 |
| 5,987,150 A * | 11/1999 | Coppinger | 348/474 |
| 6,057,860 A * | 5/2000 | Hoffert et al. | 345/501 |
| 6,072,503 A * | 6/2000 | Tani et al. | 345/473 |

OTHER PUBLICATIONS

William H. Press et al., Numerical Recipes in C, The Art of Scientific Computing, Second Edition, 3.6 Interpolation in Two or More Dimensions, 1992, pp. 123–128.

Leonard I. Suckle, IEEE, International Conference on Consumer Electronics, FAM 20.2, Automatic Alignment Techniques for Color TV Manufacturing, Jun. 8–10, 1988, pp. 284–285.

SGS–Thomson Microelectronics, Multisync on Screen Display for Monitor, STV9420/21, pp. 1–32.

Society for Information Display International Symposium, Digest of Technical Papers, vol. XXV, Jun. 14–16, 1994.

James R. Webb, Micro–Chip Architecture for Full Digital Control of Geometry, Convergence and Colorimetry in CRT Monitors, Jun. 14, 1994.

Charles Chuang et al., A Non–impact High Resolution Geometry Alignment System for Monitor Production.

Steven J. Lassman et al., Firmware for a Continuous Frequency CRT Monitor, Jun. 1994.

Gregory A. Kern et al., CRT Display Inspection with a Solid State Camera–3D Modelling and Parallax Correction.

Society for Information Display International Symposium, Manufacturing Technology Conference, Digest of Technical Papers, Feb. 6–8, 1996.

Arjun Ramamurthy and Alan Fridge, Distortion Measurement and Simultaneous Adjustment of Multiple Interacting Controls on CRT Monitors, pp. 55–57, Society for Information Display, Manufacturing Technology Conference, Digest of Technical Papers, First Edition, Feb. 1996, pp. 55–57.

James E. Thario et al., Auto–Compensation of CRT Alignment for Magnetic Field Influence,.

* cited by examiner

ALIGNMENT OF CATHODE RAY TUBE DISPLAYS USING A VIDEO GRAPHICS CONTROLLER

CROSS REFERENCE TO RELATED APPLICATIONS

This application claims the benefit of provisional application No. 60/038,771 filed Jan. 16, 1997.

BACKGROUND OF THE INVENTION

A. Field of Invention

This invention pertains generally to cathode ray tube (CRT) alignment and more particularly to the use of a video graphics controller within a host computer to store and transfer correction factor data to and from a CRT video display.

B. Definitions.

Address decoder means a device that interprets address information.

Align means to cause a video image to be adjusted so that distortion characteristics are reduced and the video image that is displayed on the cathode ray tube forms an image that is pleasing to the eye.

Analog decoder means a device that transforms and/or directs an analog signal to a particular channel to produce an analog or digital output signal representative of the analog input signal.

Cathode ray tube means a device that is capable of displaying an image using a magnetically deflected electron beam. A cathode ray tube may include one or more of the following: the tube structure, the phosphor screen, the deflection and control windings, including the yoke, rotation and other coils, and/or the electron guns.

Cathode ray tube (CRT) control circuitry means one or more of the following: horizontal drive circuitry, vertical drive circuitry and/or electric beam gun drive circuitry, and/or coils or windings associated with the cathode ray tube.

Combined video image and correction factor data means data or other signals that contain both video image data and correction factor data, and may contain correction factor address information.

Correction signals means any data or signal, including address information that is used in the process of aligning a video image.

Correction data means correction factor data that does not include correction factor address information.

Correction factor address means an address signal associated with correction data.

Correction factor data comprises the encoded digital bytes or any other form of data or signal that is representative of the distortion characteristics of a cathode ray tube for one or more correction factor parameters. Correction factor data may be generated by a vision system, a gain matrix table, and/or manually generated. Correction factor data may also be in the form of term multipliers and/or parametric data that is used to adjust standardized transformation equations which are representative of the amount of correction needed to align a video signal to counteract various distortion characteristics and may include correction data address information and clock information. Correction factor data may also include correction control data that represents expanded or interpolated data.

Correction factor parameters include various geometry and/or distortion characteristics of the cathode ray tube including horizontal size, raster rotation, vertical size, horizontal center, vertical center, pincushioning, vertical linearity, keystoning, convergence, etc., and various electron gun characteristics of the cathode ray tube including contrast, brightness, luminosity, focus, color balance, color temperature, electron gun cutoff, etc.

Converter means a device for generating an appropriate electronic signal in response to one or more input signals including data inputs. For example, a converter may generate an analog signal from a digital input, decode a data byte, change serial data to parallel format, or the converse of these operations and may include a PWM, a PDM, a DAC, etc.

Display device means any apparatus that produces a video image.

Decoder means a device for generating, transforming, modifying and/or directing a signal or data to a particular location or channel, in response to one or more input signals including data inputs. For example, a decoder may include a pulse width modulator, a pulsedensity modulator, a digital-to-analog converter, an interpolation engine, a lookup table, a processor, screen display chips, a channel routing device, an analog decoder, etc.

Digital data means any data that has a digital nature, including binary data.

Dissimilar data means binary, digital and/or analog signals that are not video image data. Dissimilar data may include audio data, correction factor data, or any other data not specifically related to the video image data.

Distortion characteristics means the type, location and/or amount of distortion as indicated by distortion data.

Distortion data means a signal or data that is representative of the amount of distortion that exists on a cathode ray tube with regard to certain correction factor parameters. For example, distortion data can be measured as a result of misalignment of a video image or improper amplitude or gain of a video signal.

Driver signals means the electrical signals that are used to drive the deflection and control windings, and electron guns of the cathode ray tube.

Dynamically adjusting means to make adjustments that may change during a horizontal and/or vertical scan.

Enable signal means a signal or data that is capable of activating a device.

Host computer means any apparatus having a processor that is used in conjunction with a display device. For example, this may include computers, digital television receivers, set top boxes, etc. that have a processor.

Memory or storage comprises any desired storage medium including, but not limited to, EEPROMS, RAM, EPROMs, PROMs, ROMs, magnetic storage, magnetic floppies, bar codes, serial EEPROMs, flash memory, optical storage magneto-optical storage, DVD, etc., or any improvements of these types of storage or other types of storage, as well as systems for holding information such as LANs, WANs, the internet, the world-wide web, etc.

Parallel data bytes means serial data that has been arranged in parallel format to form bytes.

Processor means a logic device including, but not limited to, state machines, microprocessors, digital signal processors (DSPs), etc.

Retrace time means that duration of time in which the electron beam in a CRT is being moved back to begin its next trace of the video image. Retrace time may occur during either horizontal or vertical retrace.

Serial to parallel converter means any device for changing serial data into parallel data.

Set top box means a processor used in conjunction with a receiver.

Television receiver means a device that receives either a digital or analog television signal and transforms the television signal into a video signal for display on a display device.

Video connector means any device, system or method for transmitting video image data and/or combined video image and/or correction factor data to a cathode ray tube monitor or CRT device, including optical, electrical, RF, magnetic, infrared, etc. connections. The video image data and correction factor data may share the same signal path, or may be transmitted on separate paths. Additionally, the video image data and correction factor data may be transmitted simultaneously or at different times, or may be interleaved or modulated.

Video graphics controller means circuitry associated with a host computer that stores and/or transmits video image data.

Video graphics controller RAM means memory or other storage used for storing video image data and correction factor data in a host computer.

Video image means the displayed image that appears on a display device that is produced in response to a video signal.

Video image data means binary, digital and/or analog signals that are representative of a video image.

C. Description of the Background

Recent developments in-the automated measurement of display device distortion characteristics, in devices such as computer cathode ray tube monitors and television cathode ray tube devices, have made it possible to actively correct display devices for numerous types of distortion. Presently, in cathode ray tube monitors, these corrections are performed within the CRT device by an intelligent digital monitor board using a dedicated processor and memory. As the ability to correct for various types of video distortion characteristics has increased, the memory size and processor speed required to facilitate video alignment has become more expensive and has increased the cost of dynamic adjustment devices. These costs have effectively limited the use of dynamic adjustment techniques to be employed by only the most expensive CRT devices. This has limited the use of dynamic adjustment techniques in most CRT monitors manufactured today.

Therefore, it would be desirable to dynamically adjust cathode ray tube monitors by implementing correction factor data without the dedicated processor and memory presently required within the CRT device. It is against this background and these problems and limitations that the present invention has been developed.

SUMMARY OF THE INVENTION

The present invention overcomes the disadvantages and limitations of the prior art by providing an apparatus and method for using a host computer processor and the memory associated with the video graphics controller to dynamically adjust video images on the CRT screen.

The present invention may therefore comprise an apparatus for storing dissimilar digital data with video image data and transmitting the dissimilar digital data and the video image data comprising, a host computer that stores the dissimilar digital data in a memory, and a video connector coupled to the host computer and the display device that transmits both the dissimilar data and video image between the display device and the host computer.

The present invention overcomes the disadvantages and limitations of the prior art by providing a dynamic method of producing an aligned video image on a CRT device by using the processor and memory of a host computer to store and transmit correction factor data representative of the distortion characteristics of a cathode ray tube. Any desired number of individual correction factor parameters, both static and dynamic, may be corrected by the method of this invention to produce the desired aligned, distortion free, video image. The present invention employs the processor and memory residing in the host computer and thus reduces the memory and processing power required within the CRT device. The present invention is capable of extending the benefits of distortion correction to a new class of lower priced display devices. Additionally, the present invention provides a convenient way of transmitting dissimilar data between a monitor and a host computer without the necessity of additional cables.

DETAILED DESCRIPTION OF THE PREFERRED EMBODIMENT OF THE INVENTION

Figure 1:
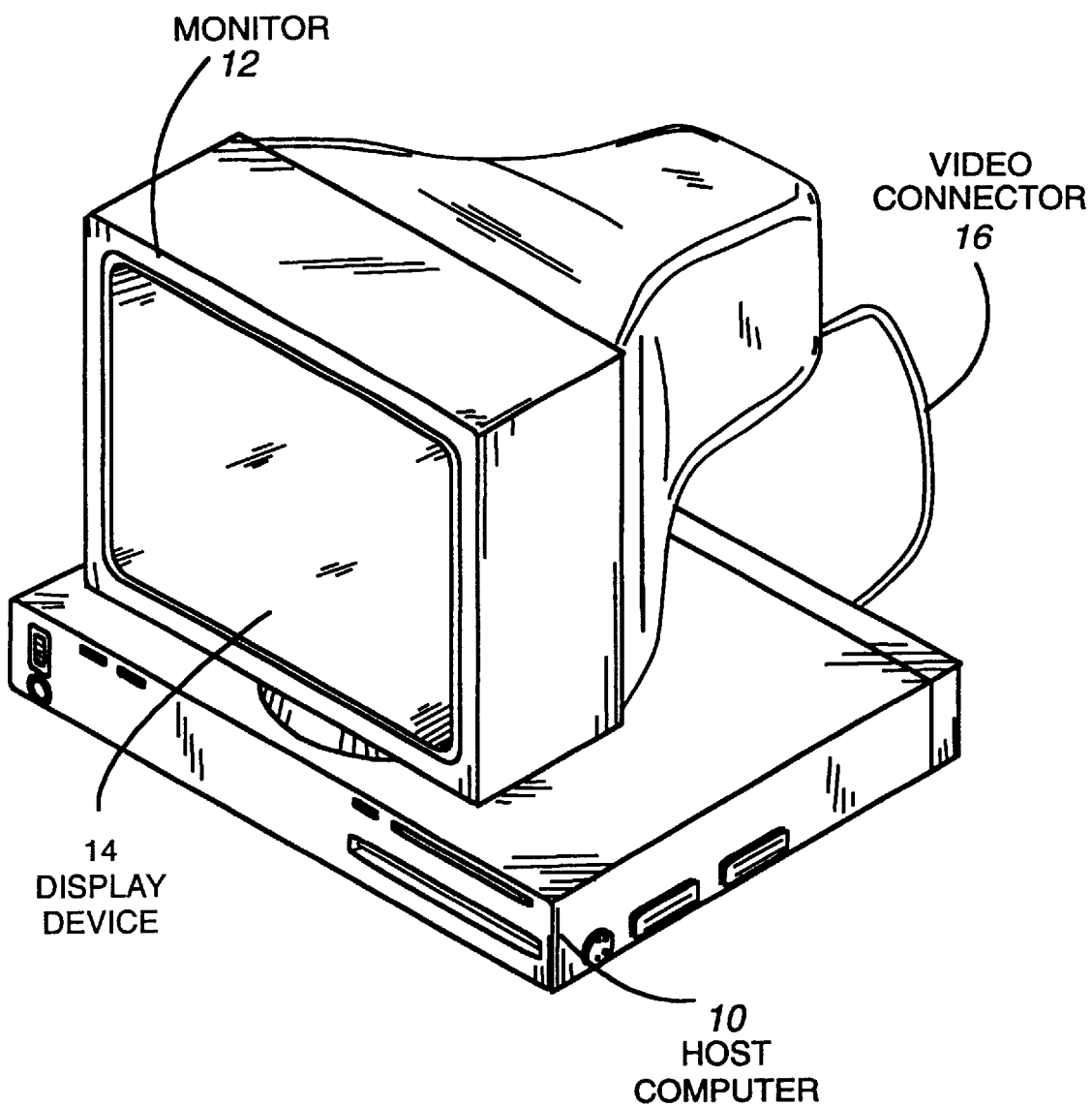
FIG. 1 is a schematic illustration of a host computer and an associated cathode ray tube monitor.

FIG. 1 discloses a host computer 10 and a monitor 12, and its associated cathode ray tube (CRT) 14, that are connected by video connector 16. Numerous and complex interrelationships exist between the various horizontal and vertical correction factor parameters (scan geometries) in cathode ray tube image displays. These relationships can be measured and characterized by correction factor data to automate CRT video image alignment. Correction factor data can be derived as disclosed in U.S. Pat. No. 5,216,204 issued to James R. Webb et al., entitled "Automatic Precision Video Alignment System" that describes the use of a vision system to measure CRT distortion characteristics and also by the interpolation engine disclosed in U.S. patent Ser. No. 08/613,902 filed Mar. 11, 1996, entitled "Interpolation Engine for Generating Font Gradients" that can be used to generate additional data points falling between the measured correction data points thus generating additional correction factor data. This patent and patent application are specifically incorporated herein by reference for all they disclose and teach. Gain matrix tables can also aid in the alignment process by predicting correction values based upon the interrelationship of correction factor parameters, such as disclosed in U.S. patent application Ser. No. 08/611,098 filed Mar. 5, 1996 by James R. Webb and Ron C. Simpson entitled "Method and Apparatus for Making Corrections in a Video Monitor" which is also specifically incorporated herein by reference for all that it discloses and teaches.

When correction factor data is generated by a vision system or generated by any other method, it may be stored in a storage device within the CRT or in any other convenient storage medium for later retrieval and use. This correction factor data may then be used by the CRT control circuitry to generate and apply driver signals as disclosed by U.S. patent applications Ser. No. 08/638,222 filed Apr. 26, 1996, by James R. Webb et al. entitled "Screen Mapping of a Cathode Ray Tube" and Ser. No. 08/611,098 filed Mar. 5, 1996, by James R. Webb et al. entitled "Method and Apparatus for Making Corrections in a Video Monitor" which are specifically incorporated herein by reference for all that they disclose and teach. As disclosed herein, the same correction factor data can be retrieved from a monitor or other storage location, processed in a host computer, and transmitted back to the CRT device circuitry over a video connector 16 to thereby eliminate the need for a dedicated processor and memory within the CRT device 12 and utilize the memory of the host computer at essentially no extra expense in the manner disclosed in copending U.S. patent application Ser. No. 08/986,257 filed Dec. 5, 1997 entitled "Alignment of Cathode Ray Tube Video Displays Using a Host Computer Processor" that is specifically incorporated by reference for all that it discloses and teaches.

Figure 2:
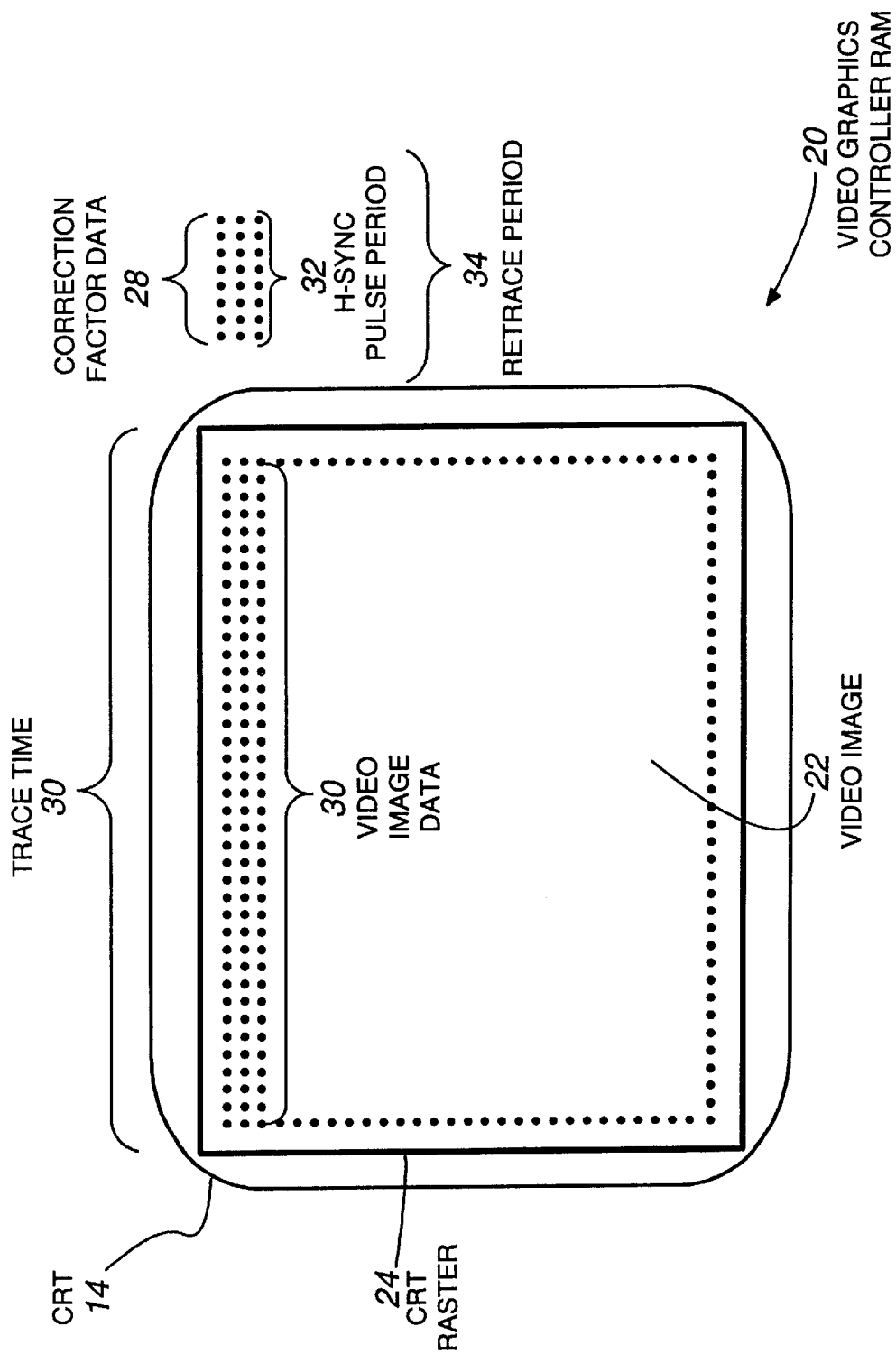
FIG. 2 is a schematic illustration of a video graphics controller RAM and data interposed on a CRT device.

FIG. 2 is a schematic illustration of combined video image and correction factor data that are stored in a video graphics controller and the manner this data is interposed on a CRT device. During trace period 30, while the video signal amplifiers are unblanked, video image data is transmitted, via video connector 16 (FIG. 1), to the CRT raster 24. During the time in which the electron beams are being repositioned to trace the next line of the video image (retrace period 34) no video image data is being transmitted. Thus, the retrace period 34 is available to transmit the correction factor data 28 or other dissimilar data. The retrace period 34 is approximately 20% of trace period 30 so there is a substantial amount of time and data transfer capability available over the video connector 16 (FIG. 1) for transmitting correction factor data 28 to the monitor 12. In fact, there is so much capacity available that it is possible to use only the horizontal synchronization (H sync) pulse period 32, which is approximately 10% of trace period 30, for transmitting the correction factor data 28. For a monitor having 640 lines, this means that approximately 64 time slots would be available for transmitting correction factor data 28 to the monitor 12. Using the H sync pulse period 32 to switch the video amplifiers is preferred, since the H sync pulse is readily available from the video graphics controller 50. In fact, many video connectors 16 have a separate line that transmits the H sync pulse from the video graphics controller 50 to monitor 12. However, should more correction factor data capacity be desired, or needed, a larger portion of retrace time 34 can be employed by using the horizontal blanking or similar pulse (not shown) for enabling transmission of the correction factor data instead of the H sync pulse 32. As also shown in FIG. 2, the correction factor data 28 is appended to the end of each line of video image data 26 and transmitted from video graphics controller RAM 20 (FIG. 3) to monitor 12, as disclosed below. Although the invention is described with regard to horizontal blanking periods, it is within the purview of the present invention to transmit data during any blanking period, including the vertical blanking period. Of course, similar techniques can be used to utilize the vertical blanking period to transmit dissimilar data, or any blanked or unused period.

Figure 3:
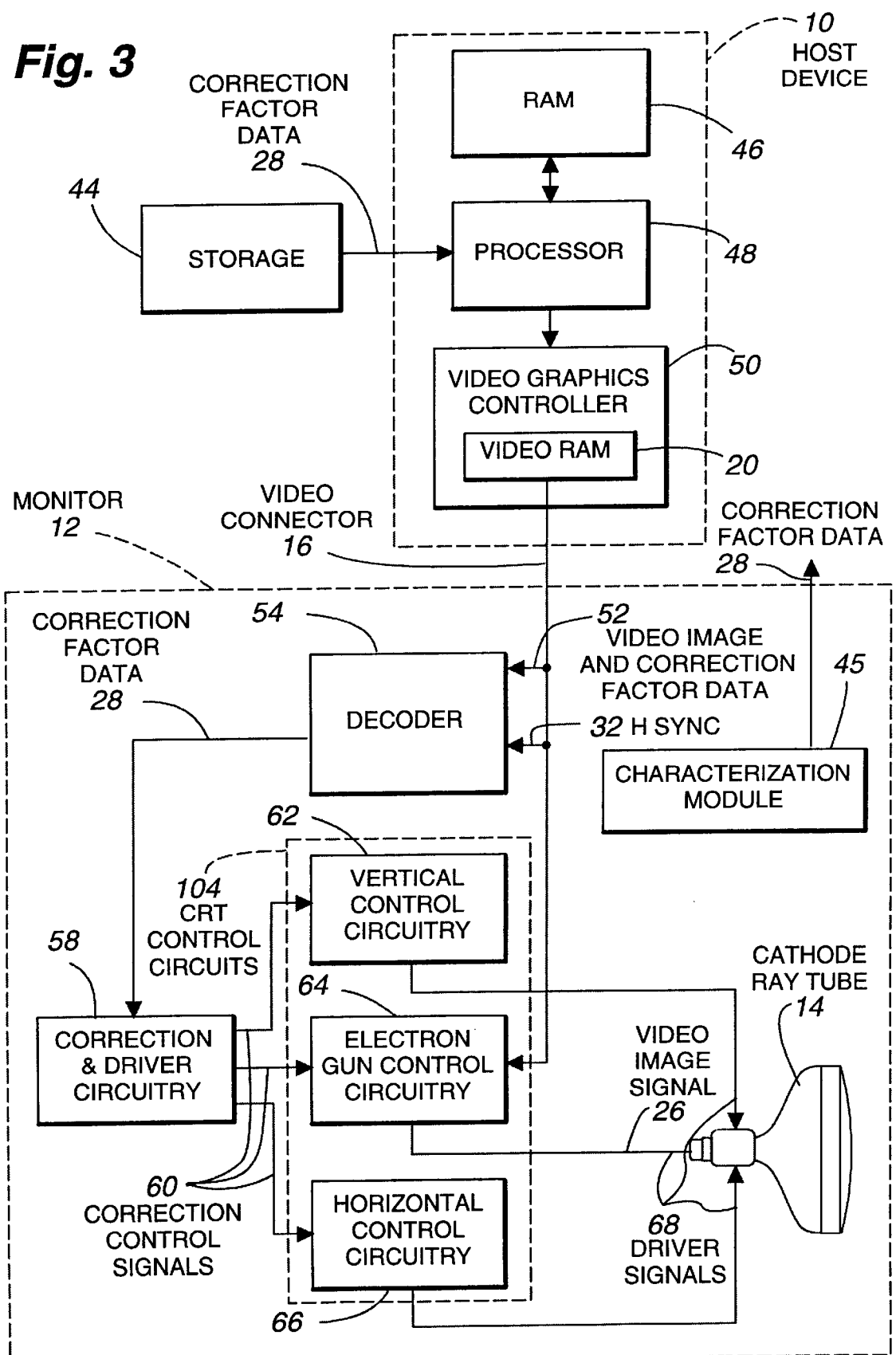
FIG. 3 is a schematic block diagram of one embodiment of the present invention.

FIG. 3 discloses a schematic block diagram of the present invention. The host computer 10 reads the correction factor data 28 from storage 44. The storage medium can be any type of storage device or memory for storing data such as magnetic storage devices, optical storage devices etc., or can be retrieved from a network, the monitor 12, or other place, as disclosed in the above referenced U.S. patent application Ser. No. 08/638,222 filed Apr. 26, 1996. For example, the correction factor data may be stored in the monitor 12 in a characterization module 45. The host processor 48 and associated RAM 46 are then used to process and store the correction factor data 28 at the end of each horizontal line of video image data 26, in the video graphics controller RAM 20.

Video graphics controllers can be programmed to write data to the RAM locations in which video data is not stored. For example, the video graphics controller can be reprogrammed in the host computer to store data at the end of each video line. Reprogramming the video graphics controller can be done quite simply in many cases, or may prove to be more difficult for video graphics controllers that contain blocks to prevent the writing of video during the horizontal retrace time. In addition, the video controller board may also be programmed to store dissimilar data on other lines of RAM that are not being used. For example, only a portion of the RAM may contain the video data, and extra lines at the bottom or top of the RAM may be programmed to store correction signals. The correction signals could either be transmitted during the retrace period, or simultaneously with the transmission of video data over separate lines that may form part of the video connector, or a separate connector such as an I$^2$C or DDC connector. In that regard, the bidirectional serial connector, such as that disclosed in U.S. patent application Ser. No. 08/986,257 filed Aug. 8, 1997, entitled "Alignment of Cathode Ray Tube Video Displays Using a Host Computer Processor", could be utilized to transfer data from the video graphics generator through the host processor and then through the serial connector to the appropriate circuitry in the monitor. This may all be done, as pointed out above, by merely programming the drivers of the video graphics controller board.

Referring again to FIG. 3, the correction factor data 28 is then transmitted along with the video image data 26 to the monitor 12 over the video connector 16 When the data stream of combined video image data and correction factor data 52 enters the monitor 12, it is sent simultaneously to a decoder 54 and to the electron gun control circuitry 64 of CRT control circuits 104. Once the correction factor data 28 is decoded, it is transmitted to the correction and driver circuitry 58 where it is conditioned and/or further decoded as described in U.S. patent applications Ser. No. 08/638,222 filed Apr. 26, 1996, by James R. Webb et al. entitled "Screen Mapping of a Cathode Ray Tube", and U.S. patent application Ser. No. 08/611,098 filed Mar. 5, 1996, by James R. Webb et al. entitled "Method and Apparatus for Making Corrections in a Video Monitor" also referenced above. After decoding and/or conditioning by the correction and driver circuitry 58, the correction and driver circuitry create correction control signals 60 which are then routed to the vertical control circuitry 62, the electron gun control circuitry 64, and the horizontal control circuitry 66, which form the CRT control circuits 104. The CRT control circuits 104 use the correction control signals 60 to generate driver signals 68 that are applied to the CRT electron guns and control windings to align the video image on cathode ray tube 14. Although FIG. 3 discloses the transmission of a combined video and correction factor data signal, dissimilar data other than correction factor data may also be transmitted over video connector 16. For example, audio data could be sent to a display device containing speakers together with the video image data, and thus eliminate the need for a separate audio connection and driver board typically used for this purpose.

Figure 4:
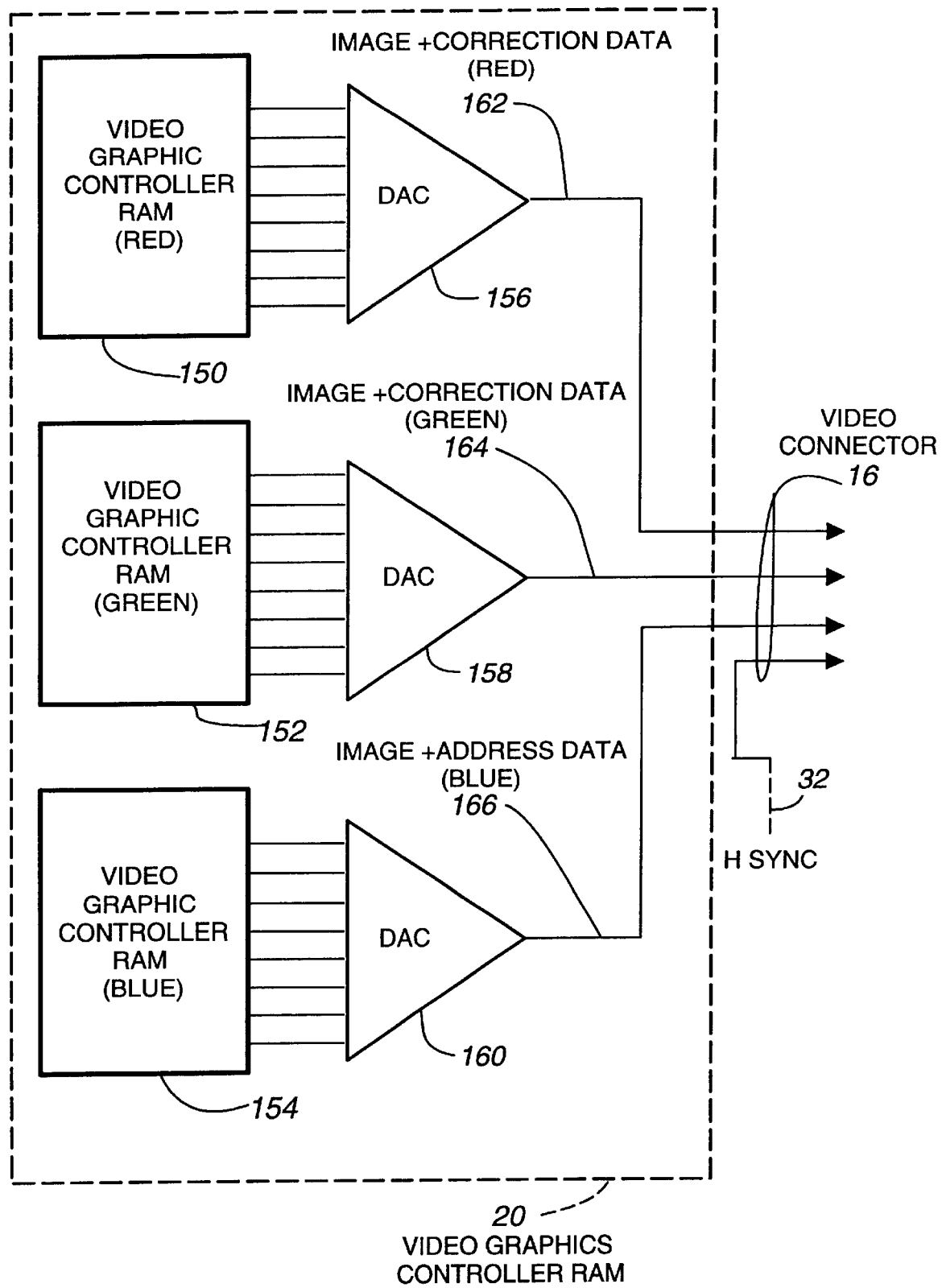
FIG. 4 is a schematic block diagram of a video graphics controller RAM.

FIG. 4 is a schematic diagram of portions of the video graphics controller device 20. As shown in FIG. 4, the video graphics controller RAM may be divided into three different physical sections or different sections of the RAMs may be designated for the red raster 150, the green raster 152, and the blue raster 154. The output of these portions of the RAM are fed, respectively, to digital-to-analog converters 156, 158 and 160. The digital-to-analog converters take each output byte and transform the byte into an analog signal that may have 256 different levels. The analog output signal from DAC 156 is an analog signal 162 that carries the red raster image data plus a correction signal that has been stored at the end of each line, as disclosed above. Similarly, output 164 carries green raster image data plus a correction signal. The output of DAC 160 comprises blue raster image data plus address data on output line 166. Each of these lines, 162, 164, 166, form a portion of the video connector 16. In many cases, the video connector 16 will also include a horizontal sync signal that is transmitted over a separate line 168, as well as other connectors.

Figure 5:
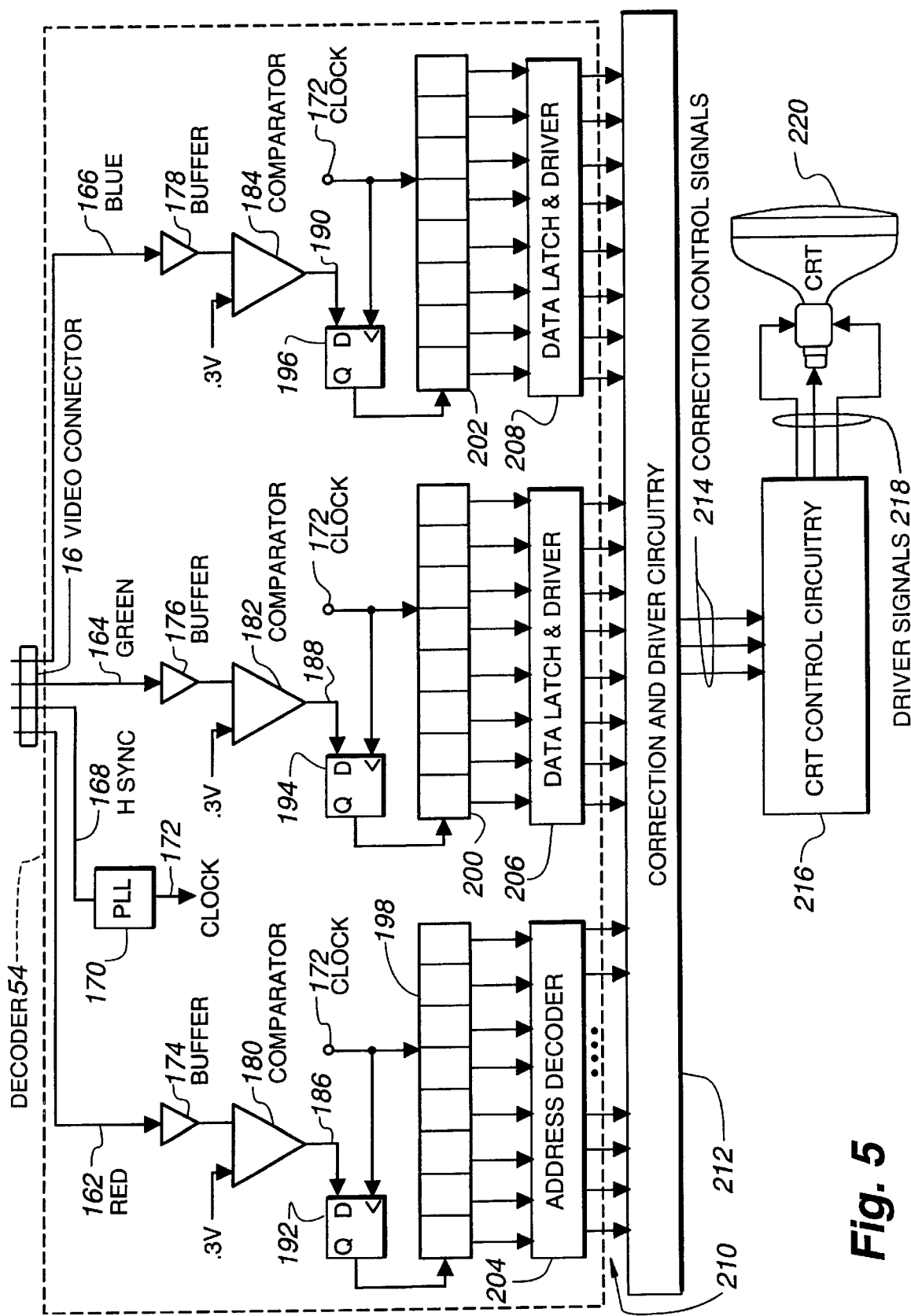
FIG. 5 is a detailed block diagram of a decoder including a serial to parallel converter and address decoder, correction and driver circuitry, CRT control circuitry and cathode ray tube in accordance with one embodiment of the present invention.

FIG. 5 discloses one embodiment of a decoder 54, illustrated in FIG. 3. As shown in FIG. 5, the video connector 16 transmits the image and dissimilar data over the red input 162, green input 164, and blue input 166. In addition, connector 168 transmits the H sync signals to a phased locked loop 170 that generates a clock signal 172. Each of the connectors 162, 164, 166 are also connected to the electron gun control circuitry, as illustrated in FIG. 3, but not shown in FIG. 5, for purposes of simplicity.

As shown in FIG. 5, each of the inputs 162, 164, 166 is connected to buffers 174, 176, 178, respectively. These buffers function to hold each signal that is received and provides level translation to an appropriate voltage level in the monitor. The output of buffers 174, 176, and 178 are transmitted to comparators 180, 182 and 184, which function to compare the output signals produced by the buffers with a reference voltage, such as 0.3 volts. If the output signal from the buffers 174, 176, 178, exceeds the reference voltage, an output is produced on outputs 186, 188 and 190. These outputs are clocked into latches 192, 194, 196 by clock signal 172 that is generated by the phased locked loop 170. The latched output is then clocked through the serial shift registers 198, 200 and 202. The serial shift registers shift the data from each of the latches until eight bits are loaded into the shift register. At that point, each of the shift registers downloads an 8-bit byte. Shift register 198 downloads an 8-bit byte to address decoder 204. Shift register 200 downloads an 8-bit byte to data latch and driver 206. Shift register 202 downloads an 8-bit byte to data latch driver 208. Address decoder 204 generates a plurality of outputs 210 which are used to enable different decoders and DACs in the correction and driver circuitry 212. Data latch and driver 206 and data latch and driver 208 load the 8-bit bytes on a bus (not shown) which is also connected to the various signal decoders in the correction and driver circuitry. When a particular decoder is enabled by the address decoder output 210, that decoder retrieves data from the bus in the correction and driver circuitry on which the data is loaded from the data latch and drivers 206 and 208. The correction and driver circuitry generates correction control signals 214 that are applied to the CRT control circuitry 216. This CRT control circuitry 216 generates driver signals 218 that are applied to the cathode ray tube 220.

In this manner, the embodiment illustrated in FIG. 5 uses the analog signal generated at the output of the video graphics controller, and simply generates a single byte based upon whether that signal exceeds a predetermined threshold voltage. Additional embodiments, disclosed below, disclose ways of retrieving significantly more data from the output of the video graphics controller.

Figure 6:
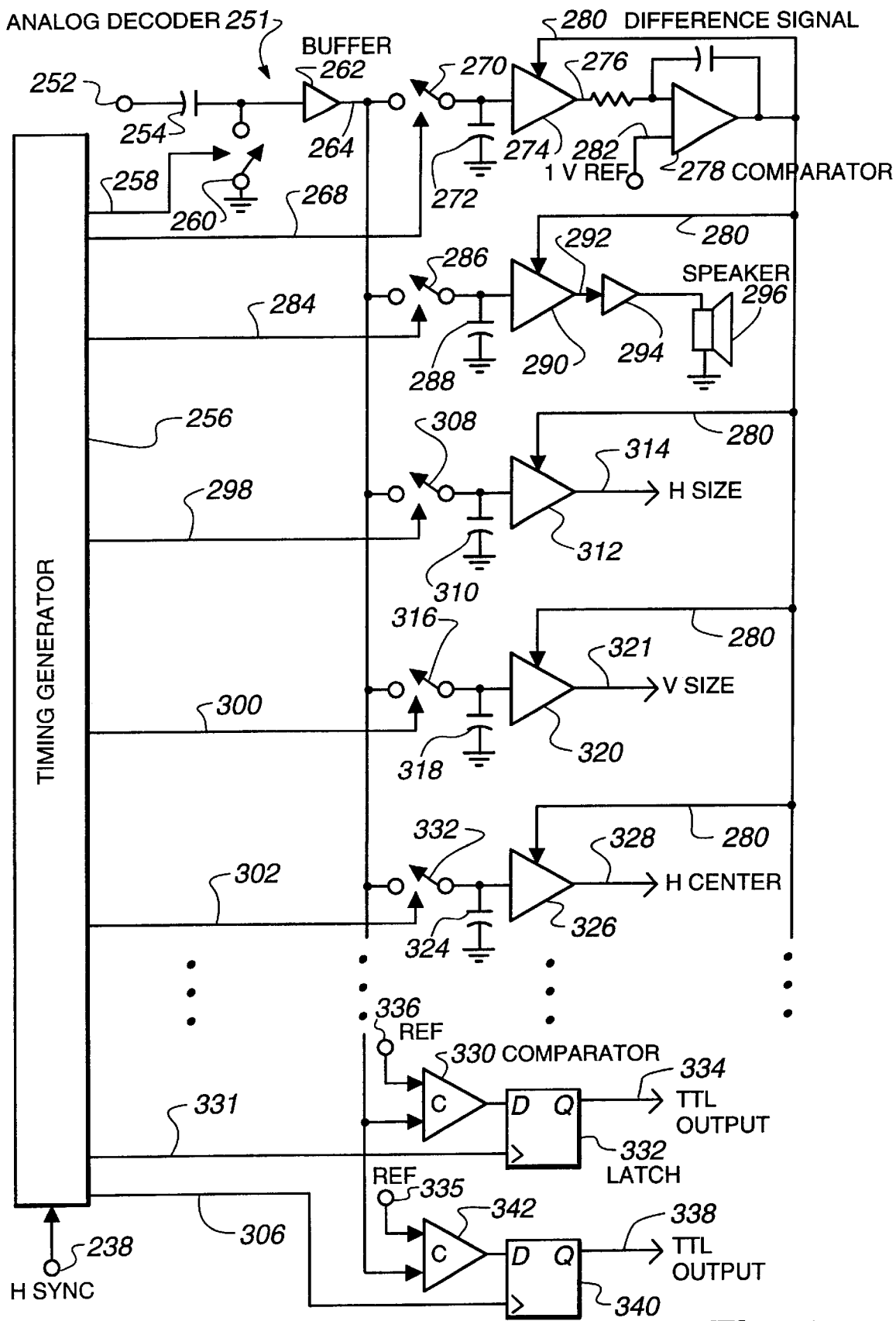
FIG. 6 is a schematic diagram of one embodiment of an analog decoder.

FIG. 6 discloses an analog decoder that is capable of scaling the voltage level of the analog signal generated by the output of the digital-to-analog converters 156, 158, 160 disclosed in FIG. 4 to a predetermined range of voltages in the monitor 12. The analog decoder of FIG. 6 illustrates a single channel of a device for detecting one of the particular 256 levels of analog signals that are generated by the DACs 156, 158, 160. For example, the input 222 may be coupled to one of the outputs 162, 164 or 166 of FIG. 4. As explained below, output 166 can also comprise both image and correction data, rather than address data, since the location of the data in a particular time slot is indicative of its particular address. This is explained more fully with regard to FIG. 7 below.

Figure 7:
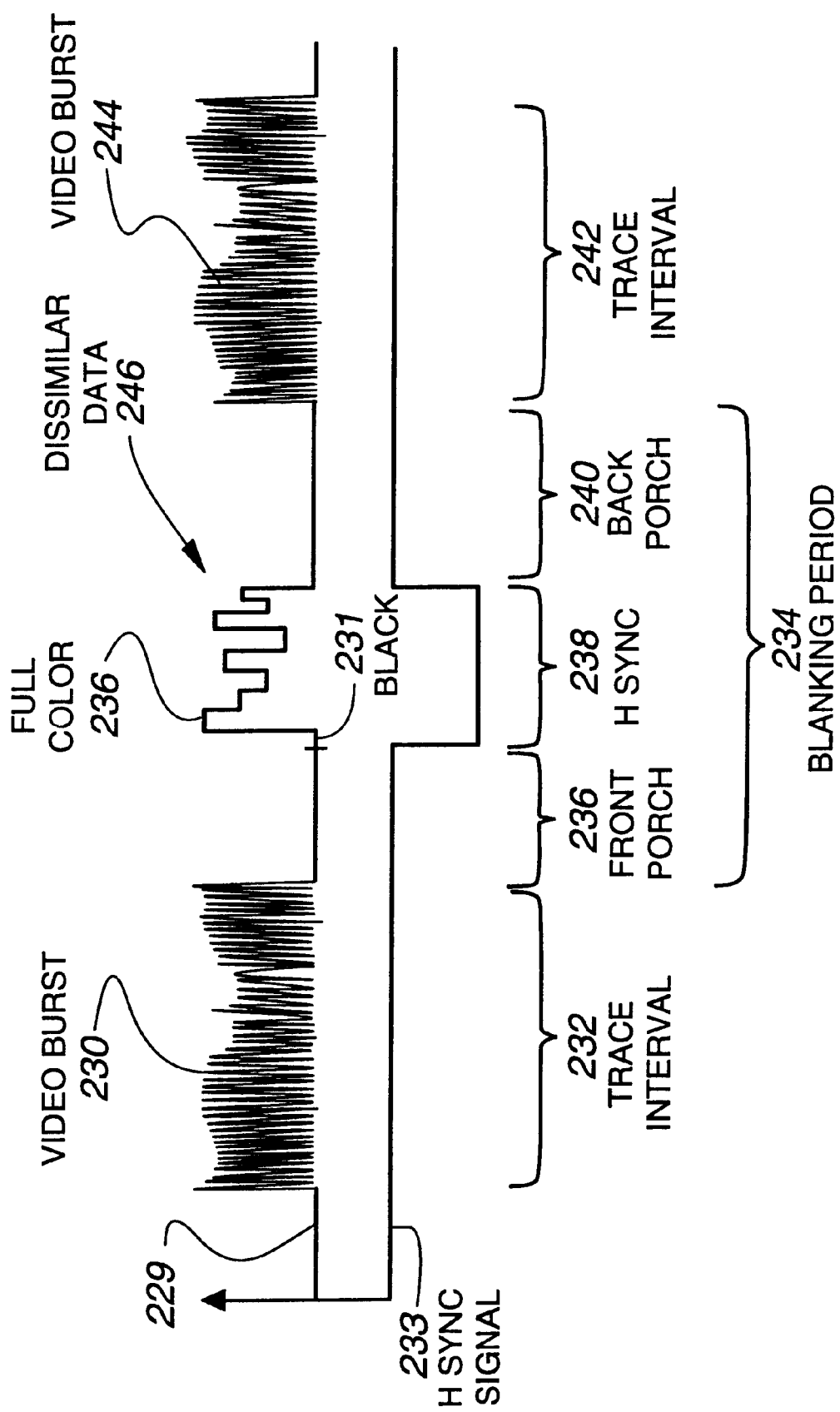
FIG. 7 is a diagram of a single color channel signal and an H sync signal in accordance with one embodiment of the present invention.

FIG. 7 illustrates a video signal 229 on a single channel such as the red channel 162 (FIG. 4), and the H sync signal 233. As shown in FIG. 7, a video burst 230 on channel 229 occurs during the trace interval 232 during which the electron beam is tracing out a horizontal line on the cathode ray tube screen. Between video bursts, a blanking signal is generated during a blanking period 234. The blanking period 234 corresponds to the horizontal retrace period. The blanking period 234 is composed of a front porch 236, a horizontal sync period 238, and a back porch 240. At the end of the blanking period 234 another trace interval 242 begins with a video burst 244. The entire process then repeats.

As illustrated in FIG. 7, dissimilar data 246 is transmitted during the horizontal sync period 238. Although the dissimilar data 246 is shown as nine different individual pulses, numerous pulses can be transmitted, dependent only on the number of time slots available. Dissimilar data 246 is illustratively illustrated in FIG. 7 as a series of different size analog voltage signals. They are produced at the output of the digital-to-analog converters shown in FIG. 4. The magnitude of each of the pulses of the dissimilar data 246 can be one of 256 different levels based upon the 8-bit byte that is converted to an analog signal by the digital-to-analog converters illustrated in FIG. 4. The dissimilar data pulses 246 can be generated for each clock pulse, which may correspond to the pixel clock rate. The clock pulses are generated, for example, by the phased locked loop 170, illustrated in FIG. 5, based upon the horizontal sync signal 168. As explained above, if the horizontal sync signal 238 has a period that is 10% of the trace interval 232, for simple VGA monitors, there would be 480 clock pulses or time slots. Although dissimilar data pulses 246 can be transmitted during the horizontal sync signal 238, the dissimilar data 246 could also be transmitted during a portion of the front porch 236 and/or back porch 240 to further expand the amounts of dissimilar data 246 that could be transmitted during the blanking period 234. Furthermore, since each pulse of a dissimilar data 246 is an analog signal having 256 different analog voltage levels, these signals can be decoded into an 8-bit byte.

Referring back again to FIG. 6, the analog decoder illustrated in FIG. 6 is capable of decoding the magnitude of each of the dissimilar data pulses 246 (FIG. 7) to retrieve an output indicative of one of the 256 different magnitudes of a dissimilar data 246. Additionally, the analog decoder 251 of FIG. 6 utilizes the time slot in which each of the pulses of a dissimilar data 246 is temporally positioned to direct the dissimilar data to a particular output of the analog decoder illustrated in FIG. 6, as will become apparent from the description below.

As shown in FIG. 6, the input 222 that is received from the digital-to-analog converter of the video graphics controller board is applied to a capacitor 254. The input 252 is connected to the video connector which may have different lengths that may result in different impedances that, in turn, may affect the signal levels received by the analog decoder 251. For this reason, a black level signal, that occurs in time slot 231, as shown in FIG. 7, may be initially sent through the video connector that is indicative of the magnitude of the dissimilar data pulse at a zero magnitude level, or black level. Timing generator 256 generates an enable signal on output 258 that enables the switch 260 so that it is in the closed position. Timing generator 256 generates the enable pulse 258 during an initial time slot at the beginning of the H sync signal 238 illustrated in FIG. 7. Switch 260 grounds the right side of the capacitor 254 to indicate a black level signal. Any difference in the voltage level of a black level signal and ground potential is stored in the capacitor 254. Capacitor 254 is connected to the input of a level translator buffer 262 that generates an output signal 264 having a translated voltage level that is appropriate for use with the remaining circuitry illustrated in FIG. 6.

During the next (second) time slot 236 that is illustrated in FIG. 7, a full magnitude dissimilar data pulse is generated. Referring again to FIG. 6, timing generator 256 generates an enable signal 268 during the second time slot 236 (FIG. 7) which enables the closure of switch 270 during the second time interval 236. The full magnitude signal is stored on capacitor 272 and applied to the input of variable gain amplifier 274. The output 276 of the variable gain amplifier 274 is applied to the input of a comparator 278 that compares the output 276 with a reference voltage 282, such as a 1-volt reference signal. The difference between the 1-volt reference signal 282 and the full magnitude dissimilar data pulse 236 (FIG. 7) is generated at the output 280 of the comparator 278. The difference signal is applied to the gain input of the variable gain amplifier 274 and other variable gain amplifiers that are illustrated in FIG. 6. As a result, the output of the variable gain amplifiers are all increased by the same amount so that a full magnitude signal generates a 1-volt output from each of the variable gain amplifiers. The variable gain amplifiers illustrated in FIG. 6 are all matched to provide similar gains. In this manner, both the black level and full color level signals are produced in the analog decoder illustrated in FIG. 6 independently of the impedance characteristics of the video connector, or other factors that may affect the voltage levels of the signal received at the input 252 of the analog decoder 251.

FIG. 6 additionally illustrates the manner in which the 256 level analog voltage signal can be decoded and applied to various outputs. Timing generator 256 generates the next output 284 which occurs during the next (third) time slot. This time slot may be designated for a particular type of dissimilar data such as sound data that is desired to be transferred from the host computer to the monitor. For example, it may be desirable to include speakers within the monitor and not require an additional sound cable and sound boards in the host and/or monitor. Sound data can be transferred by selecting one or more time slots for the dissimilar digital data. As illustrated in FIG. 6, the third time slot is enabled by timing generator 256 via enable signal 284 that enables the closure of switch 286. The 256 level analog dissimilar data signal in the third time slot is therefore transferred to and stored on capacitor 288. This signal is then applied to variable gain amplifier 290 that amplifies the signal in accordance with gain signal 280 to produce an output 292. Output 292, for example, is applied to audio amplifier 294 which amplifies the analog signal for application to a speaker 296 which is disposed in the monitor and produces an audio output. The frequency of the horizontal sync signal, in most applications, is well above the audio range so that an analog pulse can be produced for each horizontal sync signal to provide very high quality sound in the monitor.

As further illustrated in FIG. 6, the timing generator 256 generates the sequential enabling signals 258, 268, 284, 298, 300, 302, 304 and 306 that correspond to sequential time slots where the dissimilar data 246 is temporarily located, as illustrated in FIG. 7. As shown in FIG. 6, the dissimilar data pulse that is temporally located in the fourth time slot is applied to the variable gain amplifier 312 by way of enabling pulse 298, switch 308 and capacitor 310. The output 314 of the variable gain amplifier 312 may be representative of, for example, a correction signal for adjusting the horizontal size of the video image. Similarly, switch 316 is activated by enabling pulse 300 from timing generator 256 for the next time slot, so that the dissimilar data pulse is stored on capacitor 318 and applied to variable gain amplifier 320. The output of variable gain amplifier 320 may be representative of a correction signal for vertical size. The enabling pulse 302, switch 322, capacitor 324 and variable gain amplifier operate in a similar manner to produce an output 328 that may be representative of a correction signal for horizontal center. Of course, many different channels can be provided, as desired, to perform as many different functions as desired. For example, channels can be provided for convergence, brightness, contrast, rotation, etc. In this manner, data is channeled to particular outputs based upon the time slot in which the dissimilar data resides. Additionally, the 256 level analog signals can be used to adjust the video image for certain sections of the monitor screen or, for each line. For example, a pulse could be sent on each line for the horizontal size adjustment so that the horizontal size could be adjusted for each line of the monitor. Also, each of the outputs can be directed to software programmable switches (not shown)

which would allow each of these channels to be directed to different locations in the correction and driver circuitry 58 using program code instructions. This would allow additional data to be sent for any particular function, and could be modified for different portions of the screen or for different screens during vertical retrace. Also, the outputs 314, 321 and 328 may be used directly as an analog signal or may be decoded into an 8-bit byte signal, as desired, and more fully explained below. In fact, these outputs can be applied directly to integrators or filters of correction and driver circuitry 58, rather than to a particular decoder 94, since the output 336 constitutes an analog level signal. This may be a preferred manner of generating the correction signals in some instances because the decoders and DACs can be eliminated. As disclosed in U.S. patent application Ser. No. 08/638222, filed Apr. 26, 1996 entitled "Screen Mapping of a Cathode Ray Tube", and shown in FIG. 12, the integrators and filters are connected to various summing amplifiers to apply the appropriate signals to the appropriate control circuitry to generate driver signals to drive the CRT coils in the manner desired. In this manner, the rearrangement and filtering can be done in the correction and driver circuitry 58 illustrated in FIG. 3.

As also shown in FIG. 6, single bit outputs 334 and 338 can be generated in conjunction with the other circuitry illustrated in FIG. 6. In this case, enabling signals 331 and 306 are applied to the clock input of the latches 334 and 340, respectively, which latch the input provided by comparators 330 and 342. Comparators 330 and 342 compare the input signal 264 with the predetermined reference voltages 335 and 336, such as 0.3 volts. Whenever the input signal from input 264 exceeds the 0.3 volts, comparators 330 and 342 generate outputs 334 and 338, respectively, which are latched only when the enablement signals 331 and 306 are present. In this manner, single bits are generated which can be used for various purposes. For example, a byte of data can be generated using eight of these channels, or each bit can be used to perform a specified function such as to light an LED to indicate a mode of operation of the function of the monitor or host computer.

Figure 8:
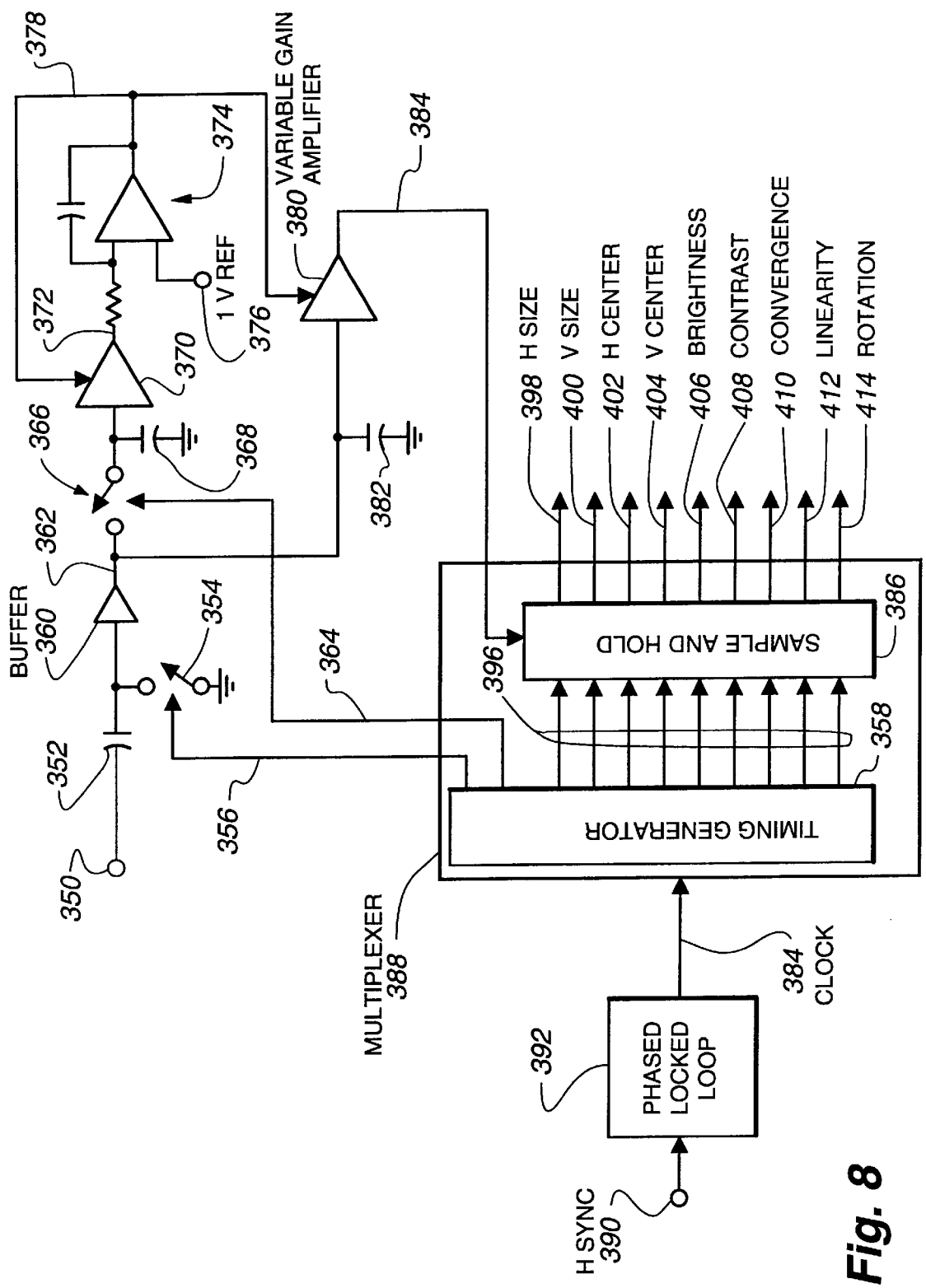
FIG. 8 is a schematic diagram of another embodiment of an analog decoder.

FIG. 8 is a schematic illustration of another embodiment of an analog decoder similar to the analog decoder illustrated in FIG. 6. As shown in FIG. 8, a single input channel 350 is illustrated. This single input channel may be a single channel, such as output 162 from the video graphics controller 20 that is illustrated in FIG. 4. When the analog signal on connector 350 is received from the video graphics controller, it is stored on the capacitor 352. Timing generator 358 then generates an enable signal on output 356 that enables the switch 354 so that it is in the closed position. Timing generator 358 generates the enable pulse on line 356 during the initial time slot at the beginning of the H sync signal 238, illustrated in FIG. 7. Switch 354 grounds the right side of the capacitor 352 to indicate a black level signal. Any difference in the voltage level of a black level signal and a ground potential is stored on the capacitor 352. Capacitor 352 is connected to the input of a level translator buffer 360 that generates an output signal 362 having a translated voltage level that is appropriate for use in the remaining circuitry illustrated in FIG. 8.

As also shown in FIG. 8, during the next (second) time slot 236 that is illustrated in FIG. 7, a full magnitude dissimilar data pulse is generated. Referring again to FIG. 8, timing generator 358 generates an enable signal 364 during the second time slot 236 (FIG. 7) which enables the closure of switch 366 during the second time interval 236 (FIG. 7). The full magnitude signal is stored on capacitor 368 and applied to the input of variable gain amplifier 370. The output 372 of the variable gain amplifier 370 is applied to the input of a comparator 374 that compares the output 372 with a reference voltage 376, such as a 1-volt reference signal. The difference between the 1-volt reference signal 376 and the full magnitude dissimilar data pulse 236 (FIG. 7) is generated at the output 378 of the comparator 374. The difference signal 378 is then applied to the gain input of variable gain amplifier 380. Variable gain amplifier 380 has a gain that is identical to the gain of variable gain amplifier 370 so that the output 384 of variable gain amplifier 380 is scaled to a predetermined range of voltages, e.g., zero to one volt. The output of 362 of buffer 360 is also applied to capacitor 382, which stores each of those signals and applies it to the input of variable gain amplifier 380. Output 384 of variable gain amplifier 380 is applied to the switches 386 of multiplexer 388. An H sync signal is applied to the input 390 of a phased locked loop 392. The phased locked loop 392 generates a clock signal 394 that is also applied to multiplexer 388. Clock 392 may generate a clock pulse corresponding to each one of the time slots that are illustrated for the dissimilar data 246 (FIG. 7). In this manner, the timing generator 358 can produce a separate enable signal 356, 364 and 396 for each time slot. As shown in FIG. 8, each of the enabling pulses 396 that are produced by timing generator 358 are applied sequentially to switches 386. The output 384 of the variable gain amplifier 380 is applied to one side of the switches 386 which are enabled by each of the sequential enablement pulses 396 to direct these pulses to one of the outputs 398, 400, 402, 404, 406, 408, 410, 412, 414. Each of these outputs may be representative of particular correction signals such as horizontal size, vertical size, horizontal center, vertical center, brightness, contrast, convergence, linearity, rotation, etc. Of course, these are only a few of the correction factor parameters, and many other correction factor parameters could be provided. One of the advantages of the device of FIG. 8 is that only a single variable gain amplifier 380 is used to generate the outputs of 398–414, which may provide some consistency in these outputs and reduce the number of variable gain amplifiers required.

Figure 9:
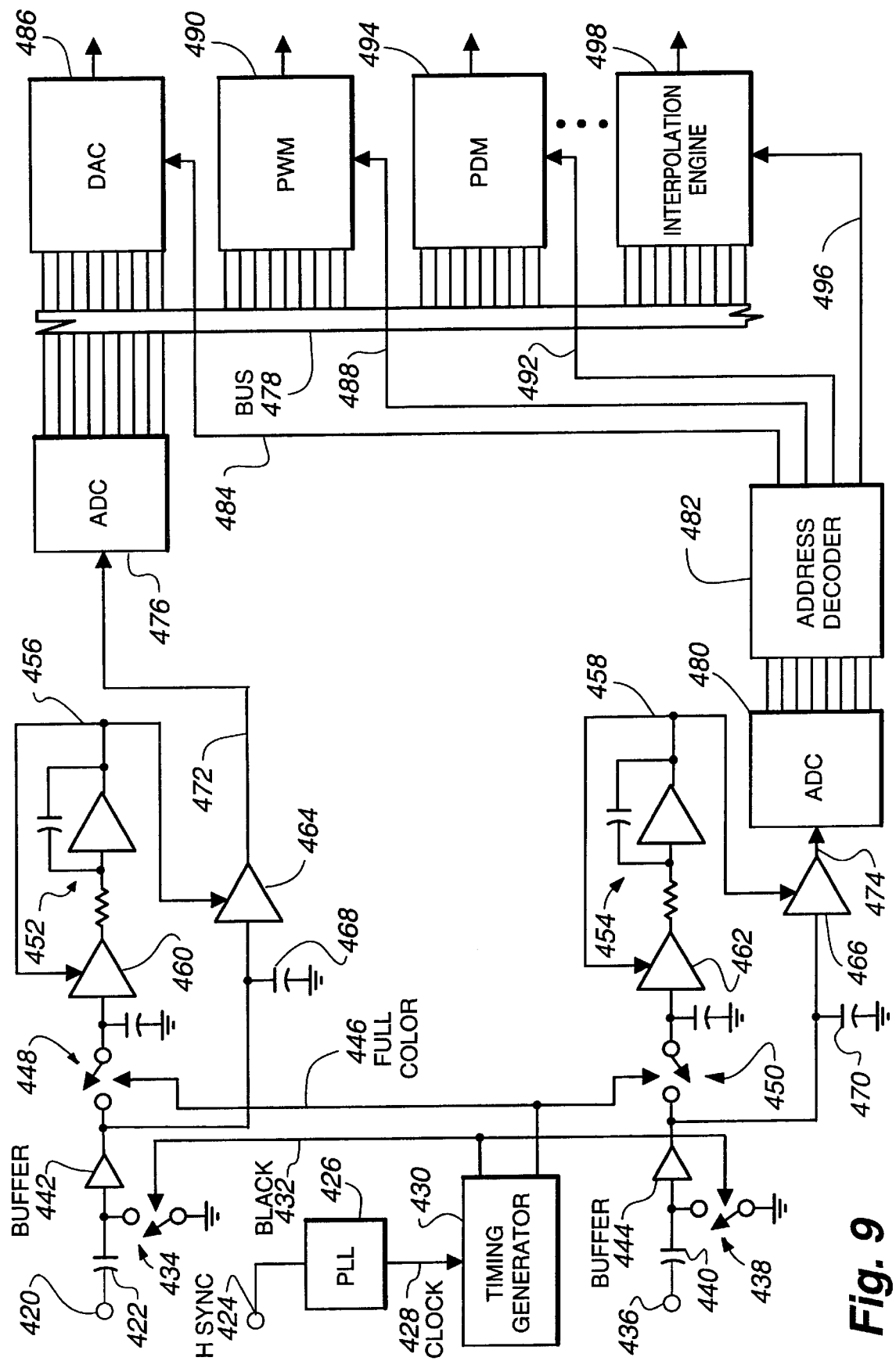
FIG. 9 is a schematic diagram of another embodiment of an analog decoder.

FIG. 9 is another embodiment of the analog decoder of the present invention. As shown in FIG. 9, an input 420 from one of the outputs of DACS 156, 158, 160 of FIG. 4 is applied to capacitor 422. An H sync signal 424 is applied to a phased locked loop 426 that generates a clock signal 428 that is applied to timing generator 430. During an initial time slot, timing generator 432 generates an enable pulse 432 that enables switch 434 when a black level pulse is being transmitted to input 420. Again, any difference between the black level pulse on input 420 and ground is stored on capacitor 422. FIG. 9 also shows a second input channel 436. During this first time slot, an enable pulse generated on output 432 of the timing generator 430 is also applied to switch 438 that closes during the transmission of a black level pulse on input 436. Again, any difference between the detected black level pulse on input 436 and ground is stored on capacitor 440. Buffers 442 and 444 function as level translators.

As also shown in FIG. 9, timing generator 430 generates an enable pulse 446 that is applied to switches 448 and 450 during a second time slot in which a full scale color signal is transmitted on inputs 420 and 436. These full scale signals are applied to comparators 452 and 454 that produce difference signals 456, 458 that are applied to variable gain amplifiers 460, 462 to adjust the full scale color inputs by the gain signal generated on outputs 456 and 458. These signals are also applied to variable gain amplifiers 464 and 466 that modify the gain of the input signals that are stored on capacitors 468 and 470. In this manner, analog signals are generated on output 472 from variable gain amplifier 464 and output 474 from variable gain amplifier 466 that are scaled to a predetermined range of voltages that are based upon the black level and full scale color signals that are transmitted over the inputs of both channels 420 and 436. The analog signal generated at output 474 is applied to an analog-to-digital converter 476 that transforms the 256-level analog signal into an 8-bit signal that is applied to bus 478. Similarly, the 256-level analog signal on output 474 is applied to an analog-to-digital converter 480 that generates an 8-bit digital signal that is applied to an address decoder 482. Address decoder 482 generates enable signals such as enable signal 484 that enables digital-to-analog converter 486. When digital-to-analog converter 486 is enabled, it retrieves the 8-bit signal that is present on bus 478 that is transferred to the bus by analog-to-digital converter 476. Similarly, address decoder 482 may generate an enable signal 488 that enables pulse width modulator 490 to retrieve the 8-bit signal from bus 478. In the same manner, enable pulse 492 can enable the pulse density modulator 494 to retrieve the 8-bit pulse, while enable signal 496 may enable the interpolation engine 498 to retrieve the 8-bit signal from bus 478. Of course, address decoder 482 is capable of generating up to 256 different enable pulses that may enable up to 256 different signal decoders, such as signal decoders 486, 490, 494 and 498. The outputs of these signal decoders are then utilized in the correction and driver circuitry. Of course, the output of two signal decoders could be used to obtain a high resolution 16 bit output that could, for example, be used to generate a high fidelity audio output.

The various embodiments disclosed above utilize the H sync signal to drive a phased locked loop which in turn produces a clock pulse. For example, this technique is disclosed with regard to the embodiments of FIG. 5, FIG. 8 and FIG. 9, and may be used in other embodiments of the present invention. A problem that may exist with regard to this technique is the synchronization of the clock pulses with the dot clock of the video graphics generator in the host, which may vary greatly from one product to another. Various techniques can be utilized to overcome these problems. For example, a single channel, such as the red, green or blue channel, could be dedicated to simply sending clock pulses at the dot clock rate of the dot clock of the video graphics generator. These pulses would vary between a black level and a full-scale color level, alternatively, to produce the necessary clock pulses for the monitor that are synchronized with the data that is being received on the other channels. Moreover, the clock pulse information could also be used to retrieve the scaling information for the other channels, since these signals vary from a black level to a full-scale level. Alternatively, the first few pulses on each channel could be used to synchronize the phased locked loop for the remaining period during which data would be sent. In this manner, a number of pulses, e.g., five to ten pulses, could be used to provide both the scaling information and synchronization information to the phased locked loop disposed in the monitor. Still another method of generating a synchronized clock pulse in the monitor would be to use a transition detector that would detect the transitions in the data pulses, thereby generating a self-clocking synchronous pulse that could be fed to the phased locked loop.

Figure 10:
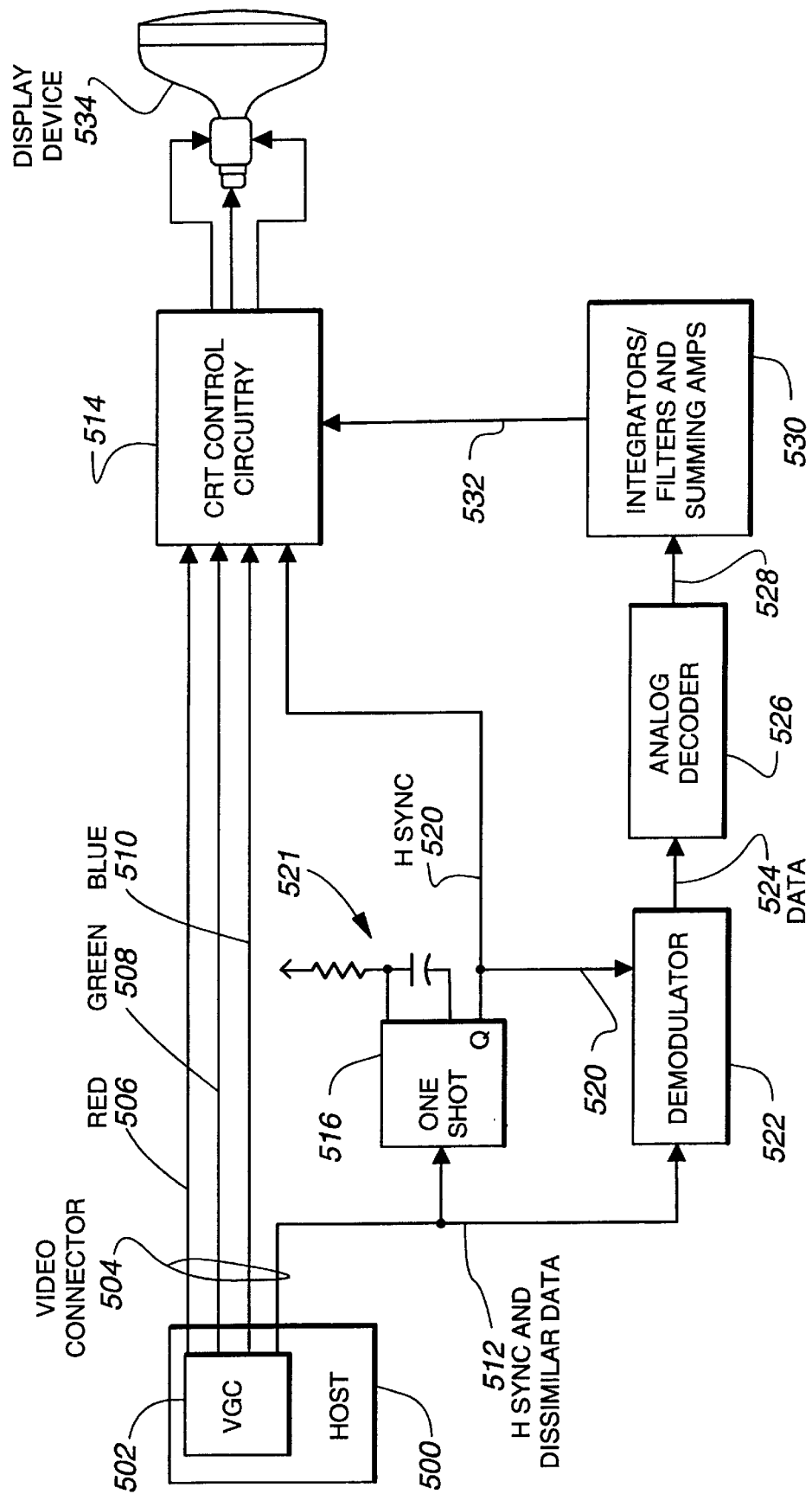
FIG. 10 is a schematic block diagram of another embodiment of the present invention.

FIG. 10 is a schematic diagram of another embodiment that utilizes different connectors for transmitting dissimilar data. FIG. 10 illustrates that dissimilar data can be transmitted over the H sync connector that is disposed within the video connector. As shown in FIG. 10, host computer 500 includes a video graphics controller board 502 that generates an output that is applied to the video connector 504. The video connector 504 includes a first connector 506 that transmits the red video image data. Similarly, connector 508 transmits the green video data while connector 510 transmits the blue video data. H sync data is normally transmitted on connector 512. Connectors 506, 508, 510 transmit the red, green and blue video information and are coupled directly to the CRT control circuitry 514. Host computer 500 has been programmed to transmit both the H sync pulse and dissimilar data over connector 512. Connector 512 is coupled to a one-shot multi-vibrator 516 within the monitor and one of the inputs to AND gate 518. The one-shot multi-vibrator 516 is coupled to a resistor/capacitor pair 521 that provides an RC time constant that is substantially equal to the period of the horizontal sync pulse. The one-shot multi-vibrator 516 generates an output as soon as it detects input 512. At the end of the RC time constant, output 520 drops to a zero output. In this manner, an H sync signal 520 is generated that is substantially similar to a standard H sync signal. As indicated above, input 512 contains both the H sync signal and dissimilar data pulses. This combined signal is applied to the input of demodulator 522 that is enabled by input 520 to produce a data output 524 that, in turn, is applied to analog decoder 526. The analog decoder 526 can constitute any of the analog decoders described herein. Analog decoder 526 generates an output 528 that is applied to the integrator/filters and summing amplifiers 530 that produces an output 532 that is applied to the CRT control circuitry. CRT control circuitry 514 generates driver signals that are applied to a display device 534. In this manner, a separate connector included within the video connector 504 is used to transmit dissimilar data. Other connectors, such as the vertical sync connector, could be used in a similar manner. Additionally, these connectors can be programmed to transmit data at any time during the video signal, i.e., not just during the blanking period, since these wires are not being used during these time periods. Hence, data may be stored in different locations in video controller RAM that are not being used, and transmitted at any time, including the time during which the video signal is being transmitted.

Figure 11:
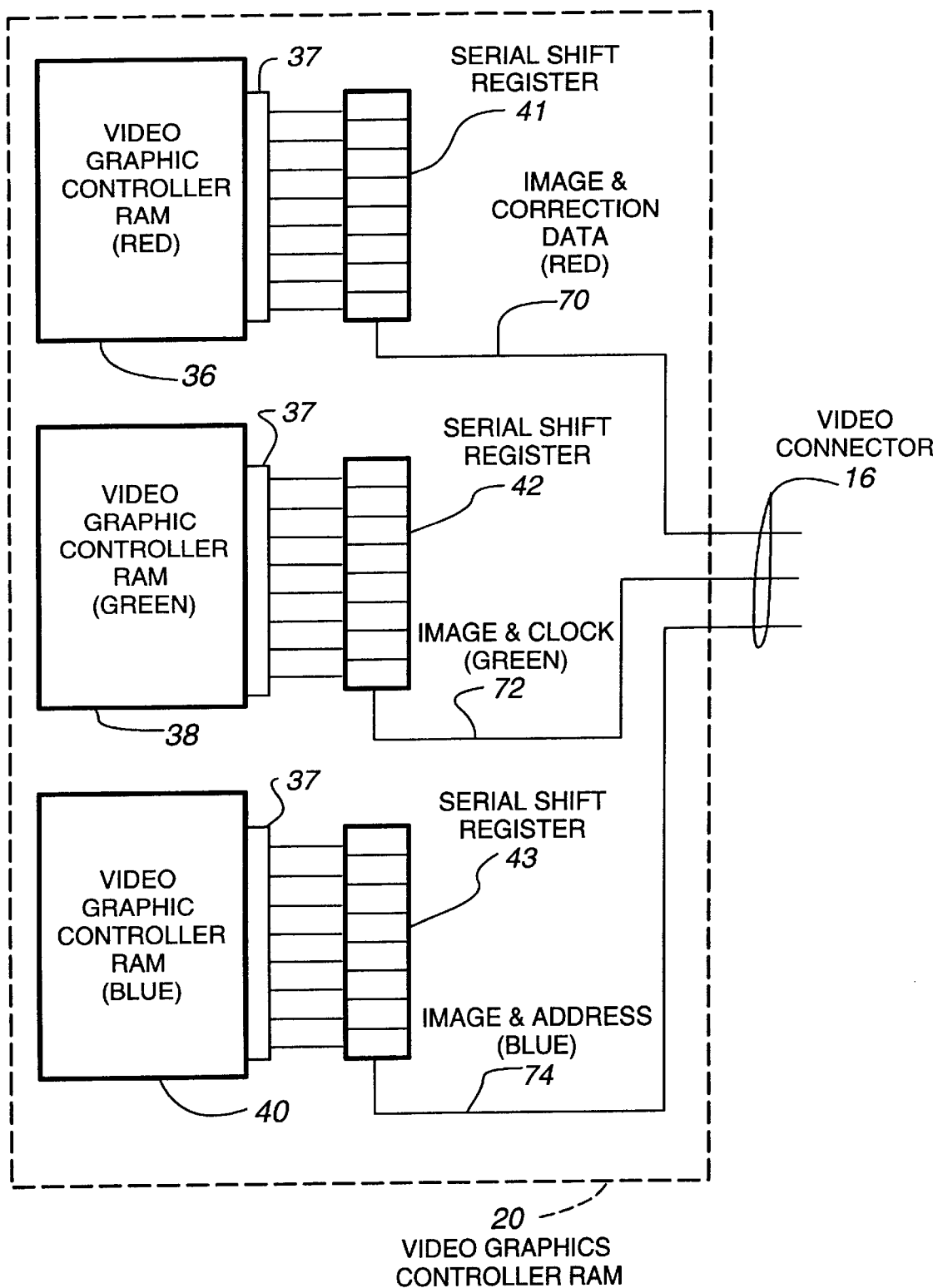
FIG. 11 illustrates an alternative connection to a video graphics controller board.

FIG. 11 is a schematic block diagram illustrating another manner of implementing a video graphics controller RAM 20. As shown in FIG. 11, the correction data, correction factor address information, and clock (together comprising the correction factor data 28) are stored together with the video image data 26 (FIG. 2) in video graphics controller RAM 20 (FIG. 3) in separate RAM files according to color. Each color has its own dedicated video graphics controller RAM or dedicated portion of a single RAM. For example, the portion 36 of the video graphics controller RAM 20 stores the red component of the video image data 26 (FIG. 2) for the red raster of CRT video image 22 (FIG. 2). Similarly, the green and blue components of the video image data 26 (FIG. 2), are stored in dedicated areas of video graphics controller RAM 20.

Expansion connectors 37 or other similar devices may provide access directly to the video graphics controller RAM, as illustrated in FIG. 7. As shown in FIG. 7, access is provided to 8-bit bytes of data from each of the red, green and blue rasters. Serial shift registers 41, 42 and 43 are connected to the parallel bytes of data from each of the RGB rasters. Each raster color (RGB) of video data is stored in the video graphics controller RAM in a parallel fashion and then synchronously transposed to serial data by serial shift registers 41, 42 and 43. The serial information is then transmitted via the red connector 70, green connector 72, and blue connector 74 of video connector 16 to the CRT monitor 12 (FIG. 1). At the end of each line of video image data 26 (FIG. 2), a portion of the correction factor data 28 is stored in the video graphics controller RAM 20 by the host processor 48.

In order to effectively adjust the video image on the CRT screen, each byte of correction data for each correction factor parameter is used to generate a proper correction signal at the correct time. For example, the process of the present invention may use the red video RAM 36 for the correction data, the blue video RAM 40 for an associated address (correction data address) of the correction data and the green video RAM 38 for clock pulses. Of course, the choice of which color of the video graphics controller RAM to use for the storage and transmission of each component of the correction factor data 28 is completely arbitrary and could be just as effectively accomplished by other combinations. Also, an H sync signal may also be provided on the video connector and a phase-locked loop can be used to generate a clock signal in the monitor 12, such as PLL 170, illustrated in FIG. 5.

Figure 12:
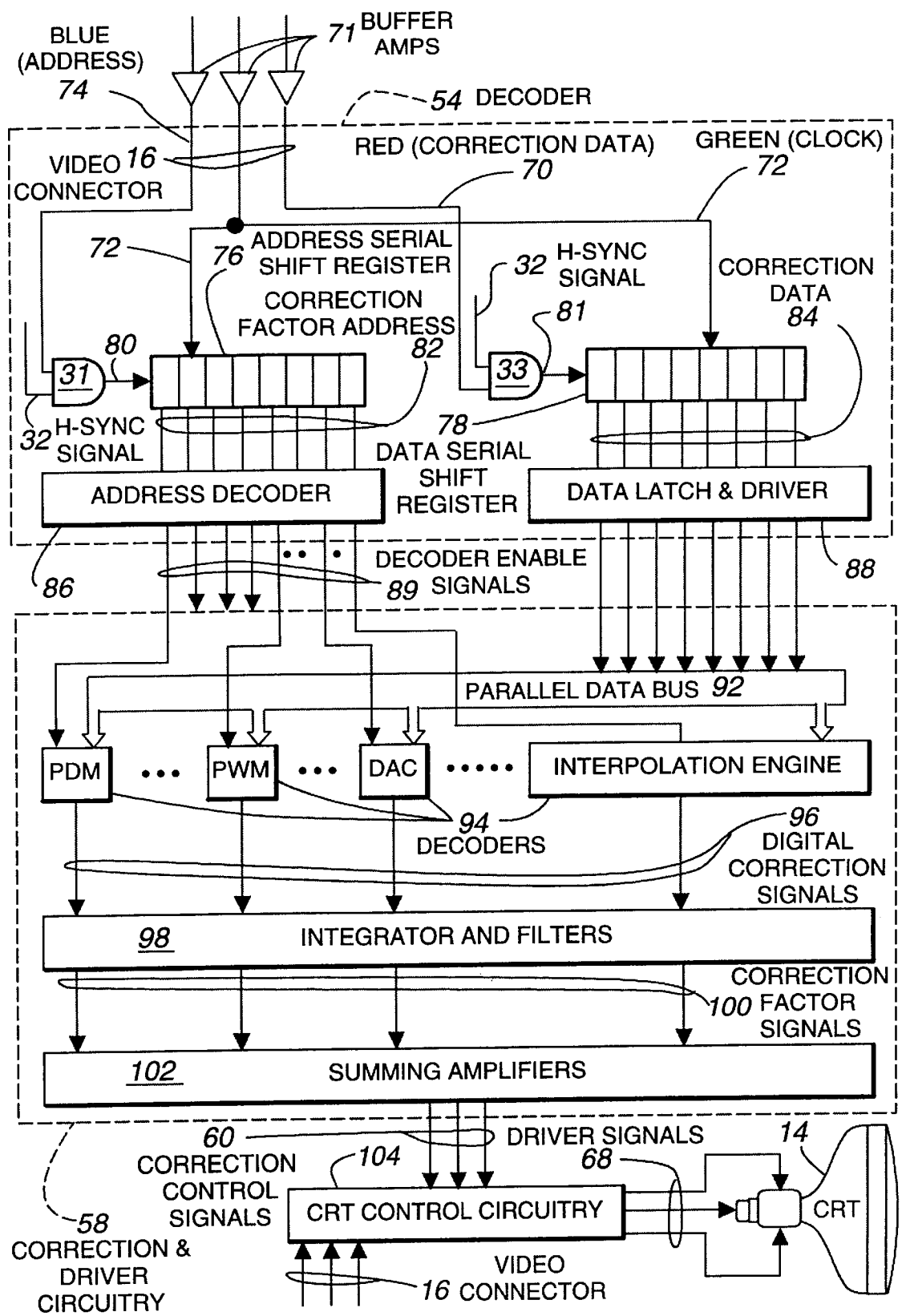
FIG. 12 is a schematic block diagram of a decoder, correction and driver circuitry, cathode ray tube control circuitry, and cathode ray tube in accordance with another embodiment of the present invention.

FIG. 12 discloses a detailed schematic block diagram of another embodiment of the decoder 54, the correction and drive circuitry 58, the CRT control circuit 104 and cathode ray tube 14. FIG. 12 schematically illustrates the manner in which the correction data and associated correction data address are used by the correction and driver circuitry 58, the CRT control circuits 104, and cathode ray tube device 14. The process of reading the correction factor data 28 (FIG. 2) from the stream of combined video image data 26 and correction factor data 28 is accomplished by using AND gates 31 and 33 along with H sync signal 32. Correction data arrives from the host computer device from the video graphics controller RAM 20 (FIG. 11) in serial format, via connector 70 video connector 16, on the end of each line of the red video image data 36. Correction data address information for each byte of correction data simultaneously arrives over line 74 on the end of each line of blue video image data 40 (FIG. 11). Similarly, the clocking information for each bit of correction data and correction factor address information is stored at the end of each line of the green video image data 38 (FIG. 11) and is synchronously transmitted over connector 72. The inputs 70, 72, 74 are coupled to buffer amplifiers 71 that produce 0 to 1 volt TTL level signals on inputs 70, 72, 74. The input level to buffer amps 71 may be standard 0.7 volt peak-to-peak video levels. Connector 74, which carries the blue raster data during trace time and address information during retrace time, is connected to AND gate 31, as shown in FIG. 5. H sync signal 32 is also applied to AND gate 31 so that connector 80 transmits address information to address serial shift register 76 during retrace time. H sync 32 may be latched for a predetermined trace period to allow the address data to be shifted into address serial shift register 76 during retrace time. Similarly, H sync signal 32 causes correction data on line 70 to be transmitted to data serial shift register 78 via connector 81 during retrace time. In this manner, the correction factor data is separated from video image data. Alternate configurations of address and data given sequentially, or as block transfers, can also be used. Various forms of parity and error checking can also be added.

As also shown in FIG. 12, correction and driver circuitry 58 includes signal decoders 94, integrators and filters 98. Signal decoders 94 may include pulse density modulators, pulse width modulators and/or interpolation engines that are capable of decoding correction data and generating digital correction signals 96 in response to correction data 90 from data converter 88. The use of pulse width modulators and pulse density modulators is more fully disclosed in U.S. patent application Ser. No. 08/611,098, filed Mar. 5, 1996, by James R. Webb et al., entitled "Screen Mapping of a Cathode Ray Tube" which is specifically incorporated herein by reference for all that it discloses and teaches. The use of interpolation is more fully disclosed also by U.S. patent application Ser. No. 08/613,902 filed Mar. 11, 1996, entitled "Interpolation Engine for Generating Font Gradients" previously incorporated above.

Referring again to FIG. 12, the data stream transmitted from the video graphics controller, via video connector 16, is transmitted in a serial format and therefore is clocked through serial shift registers 76 and 78. The correction data is transmitted as serial bits where a "1" is a full level color signal and an "0" is a black level color signal. AND gates 31 and 33 separate the correction factor data 28 (FIG. 2) from the video image data 26. Serial shift registers 76 and 78 reformat the correction data as parallel data bytes. As previously noted, correction data and correction data address information are transmitted to shift registers 78 and 76, respectively, in response to H sync signal 32, only at those times when correction factor data 28 arrives at the end of the lines of video image data. The address serial shift register 76 receives the serial correction data address information from connector 74 and serially shifts the correction data address information using the clock signal that is applied to the serial shift register 76 until 8 bits are loaded. The 8 bits are then read out in parallel format via lines 82 to address converter 86. Similarly, correction data is received by data serial shift register 78 via line 70. The correction factor data is similarly shifted into data serial shift register 78 until 8 bits are loaded. The 8 bits are then read out of the data serial shift register 78 in parallel format to data latch and driver 88 via lines 84. Of course, more than 8 bits may be used to provide higher resolution to the decoders in the correction and driver circuitry 58.

As also shown in FIG. 12, address decoder 86 decodes the address byte and generates an enable signal 89 on one or more of the decoder enable signal lines 89 that are connected to decoders 94 to enable one or more decoders 94. Data latch and driver 88 latch the byte of correction data from input 84 and drive parallel data bus 92 with the byte of correction data on lines 90. In this manner, the byte of correction data is held on the parallel data bus and effectively available on the parallel data bus 92 to be read by one or more decoders 94 that are enabled via decoder enable signals 89. For example, particular bytes of correction data 84 and associated correction data address information 82 are simultaneously clocked into data latch and driver 88 and address decoder 86, respectively. The correction data address is reformatted to parallel format to form an 8 bit byte that is decoded by address decoder 86. Address decoder 86 generates an enable signal on one or more of the enable signal lines 89 to enable one or more of the decoders 94. The enable signal enables a specific decoder 94 in accordance with the correction data address 82. The correction data is held on data bus 92 for a predetermined number of clock cycles so that it is available to the decoders 94. The correction data is read by an activated decoder 94 (DAC, PDM, PWM, Interpolation Engine, etc.) which has been enabled by the associated decoder enable signal 89 that has been generated by the address converter 86.

Referring again to FIG. 12, the decoders 94 generate digital correction signals on line 96 that are applied to integrators and/or filters 98. Integrators and/or filters 98 condition the digital correction signals to generate correction factor signals on lines 100. The correction factor signals are combined in specific ways by a summing amplifiers 102 to generate correction control signals 60 representative of the correction signals generated for a particular correction coil or electron gun at a particular time. CRT control circuits 104 generate driver signals 68 which is are applied to the CRT electron guns and windings to correct distortion.

Figure 13:
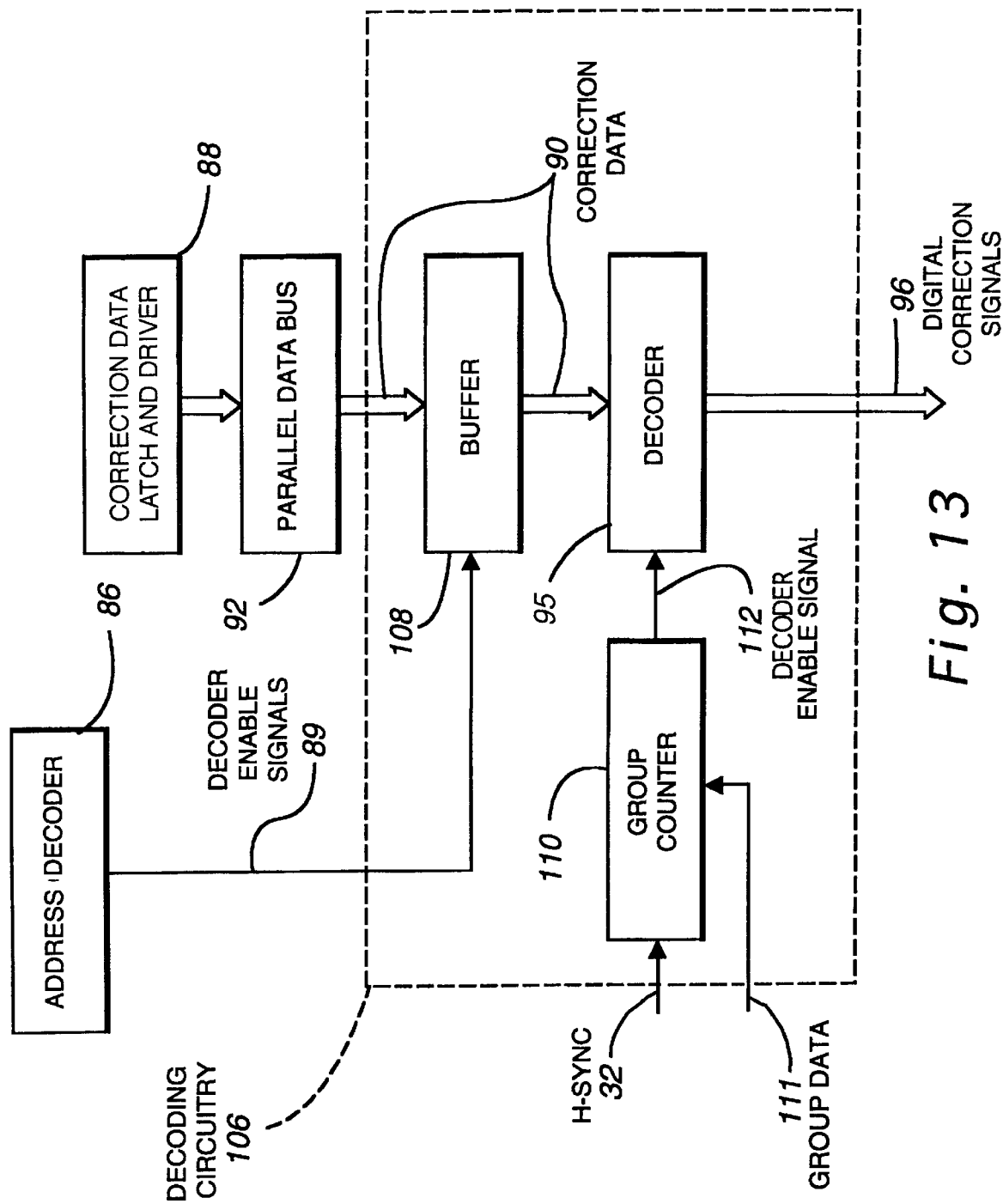
FIG. 13 is a schematic block diagram that illustrates another embodiment of the decoding circuitry of the present invention.

FIG. 13 discloses an alternative embodiment of the correction and driver circuitry 58 (FIG. 12) that may be used with the present invention. Decoding circuitry 106 is used in cases where a number of horizontal lines on a CRT device have distortion characteristics that are similar enough to be applied to the multiple lines as a group. The concept and methods of grouping CRT horizontal scan lines for the application of correction factor data is described in U.S. patent application Ser. No. 08/611,098, filed Mar. 5, 1996, by James R. Webb et al., entitled "Method and Apparatus for Making Corrections in a Video Monitor" referenced above, and may also be applied in accordance with the present invention. In this case, the correction data latch and driver makes the correction data available on parallel data bus 92 for a group of CRT scan lines. This causes a particular decoder 94 (FIG. 12) to produce the same signal for the entire group. One method of implementation is to store the correction data 90 in a buffer 108 associated with a specific decoder 95 for a particular correction factor parameter. A group counter 110 is loaded with the group count, i.e., the number of lines of each group. Group counter 110 counts pulses that are generated by H sync signal 32. When the designated count loaded into group counter 110 is reached, the group counter 110 sends a decoder enable signal 112 to decoder 95. Decoder 95 then reads the correction data from buffer 108 for the next group. The decoder 95 generates a new digital correction signal 96 from the newly loaded correction data 90 that is repeatedly transmitted until the group counter 110 generates a new enable signal 112 causing new correction data 90 for the next group to be read from the buffer 108. Of course, as disclosed in FIG. 13, applying the same data for groups of lines can also be accomplished by repeatedly loading the same correction data 90 in the requisite decoders a desired number of times until the correction data is changed or by updating group addresses only after a desired number of times that form a group, leaving the same correction data in the register. The optimum method for the application of the correction factor data will depend upon various factors such as CRT distortion characteristics, CRT type, available monitor memory, etc.

Figure 14:
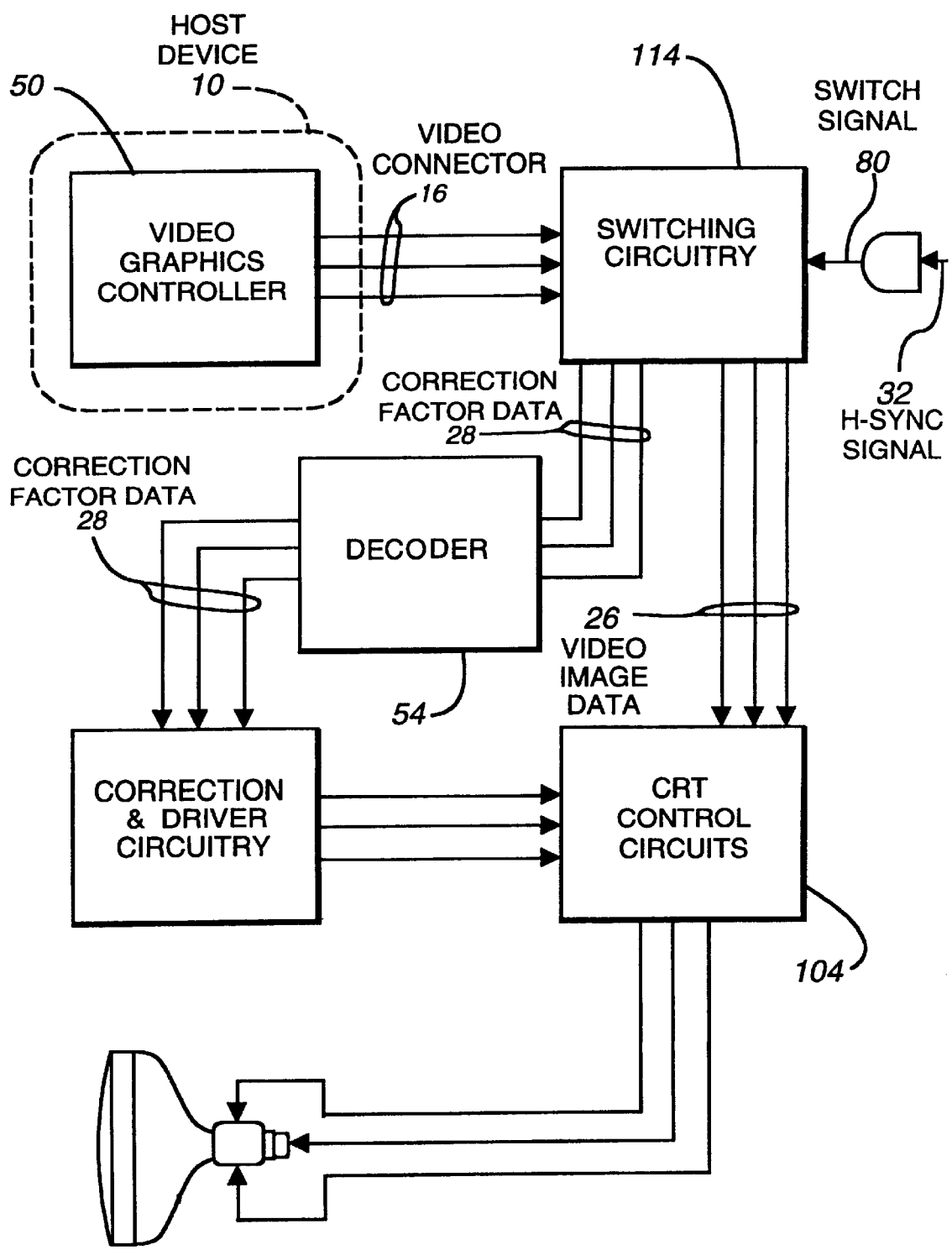
FIG. 14 schematically illustrates another embodiment of the present invention.

FIG. 14 discloses another embodiment of the present invention wherein the video and correction factor data signals are transmitted from the host device 10 over video connector 16 to a CRT device 14, as depicted in FIG. 3. In this embodiment, switching circuitry 114 is used to switch between the video image data 26 and the correction factor data 28 of the combined data stream that is transmitted over video connector 16. Switching circuitry 114 is used in conjunction with decoder 54 to switch the correction factor data 28 from the data stream. As before, the H sync signal 32 is used to activate the switch circuit 114. Other signals such as the horizontal blanking pulse could alternatively be used. During trace time, the switch routes the video image data 26 to the CRT control circuits 104. During blanking or retrace time, the switch routes the correction factor data 28 to decoder 54.

Figure 15:
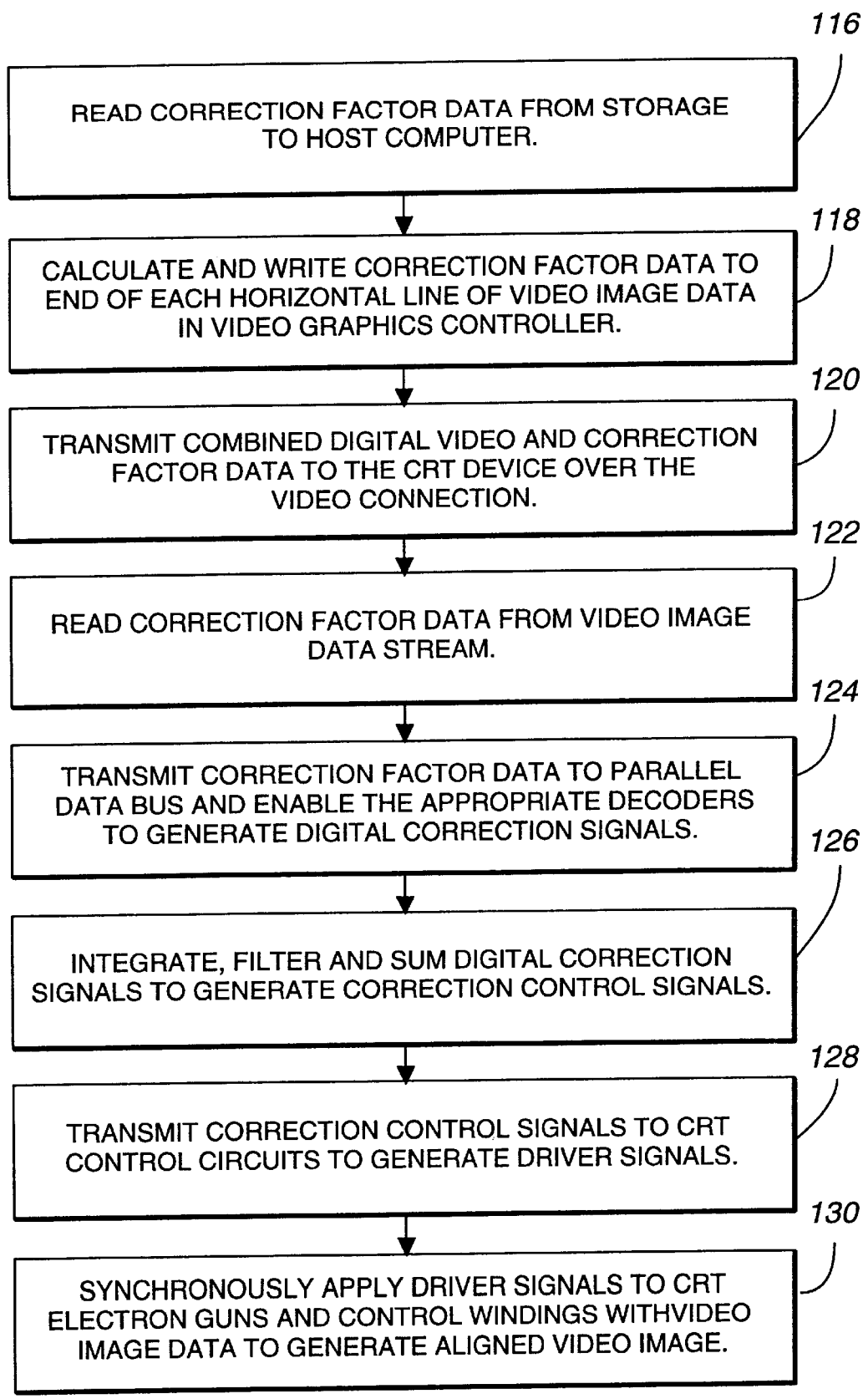
FIG. 15 is a schematic flow diagram that illustrates the steps for aligning video image in CRT device using one embodiment of the present invention.

FIG. 15 is a schematic flow diagram of the steps performed when using the system of the present invention to generate a distortion free image on the cathode ray tube device. At step 116, correction factor data is read from storage by the host computer 10 (FIG. 1) and formatted for use with the video graphics controller 50 (FIG. 3). The host processor then writes the correction factor data to the end of each line of video image data in the video graphics controller RAM at step 118. In this embodiment, correction data is written to the end of each line of red video RAM, while an associated address (correction data address) is written to the end of corresponding lines of the blue video RAM and the clock is written to the green video RAM. At step 120, the combined video image data and correction factor data is transmitted to the CRT device 12 (FIG. 1) via the video connector 16 (FIG. 1). When monitor 12 (FIG. 1) receives the correction factor data, at step 122, the correction factor data is read or switched from the combined data stream and clocked through a serial to parallel converter. Once formatted by the converter, the correction data and the respective correction data address information is transmitted to the correction and driver circuits, at step 124, where each address signal enables an appropriate decoder for the correction data. In response to the correction data, the enabled decoders (PDM, PWM, DAC, etc.) generate appropriate digital correction signals. At step 126, the plurality of digital correction signals are integrated, filtered, and summed to generate correction control signals which are then transmitted to the CRT control circuitry at step 128, to generate driver signals. At step 130, the driver signals are synchronously applied to the CRT electron guns and control windings with the video signal to produce an aligned distortion free video image.

Figure 16:
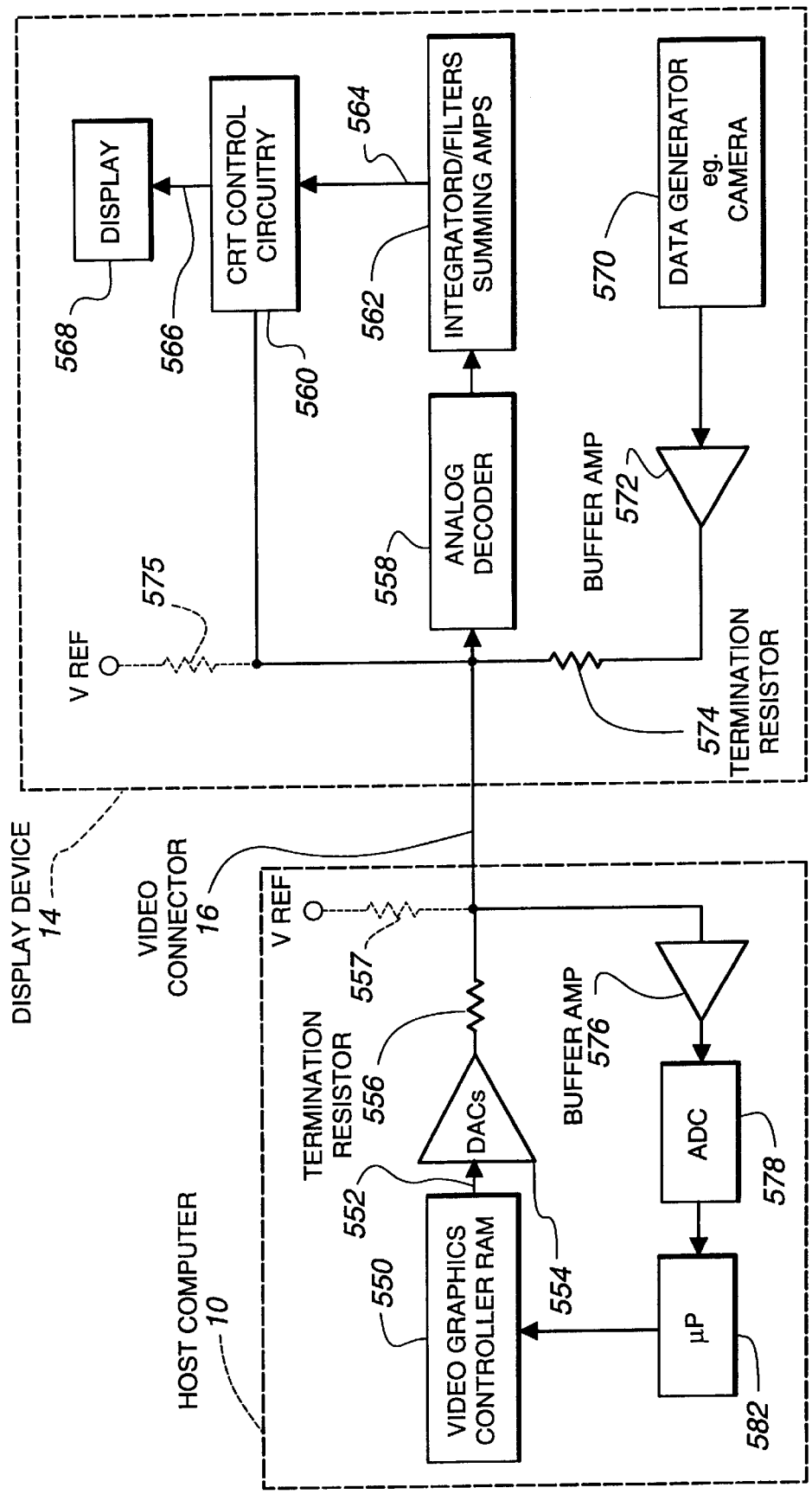
FIG. 16 is a schematic block diagram of another embodiment of the present invention.

FIG. 16 is schematic block diagram of another embodiment of the present invention that discloses the manner in which data can be transferred between a host computer 10 and a display device 14 via a video connector 16. As shown in FIG. 16, a video graphics controller RAM 550 is disposed in the host computer 10 and generates output signals 552 that may comprise both video image data and dissimilar data. The signals are applied to one or more digital-to-analog converters 554 which translate these digital signals into analog signals. These analog signals are applied to video connector 16 for transmission to display device 14. Display device 14 receives the analog signals from the digital-to-analog converters 554 by both an analog decoder 558 and CRT control circuitry 560, as disclosed above in other embodiments. These analog signals are decoded in analog decoder 558 and applied to integrators/filters and summing amplifiers 562 which produces an output 564 that is applied to the CRT control circuitry 560. CRT control circuitry then generates driver signals 566 that are applied to the display 568. Also disposed in the display device 14 is a data generator 570. The data generator can be any device that generates data and is disposed on, in or adjacent to the monitor and utilizes the video connector 16 for transmission of data that it produces. For example, the data generator can be a camera mounted on the monitor for generating video images of the user, a microphone for generating audio data or a disk drive that retrieves data from a disk for transmission from the display device 14 to the host computer 10. The data generated by the data generator 570 is amplified and buffered by buffer amp 572 and applied to isolation resistor 574. Isolation resistor 574 isolates the transmission of data from the video connector 16 into the buffer amp 572 and data generator 570. The output of the buffer amp 572 can be connected to the same wires as the wires that connect the analog decoder 558 and CRT control circuitry 560 to the video connector 16, or separate wires. For example, the output of buffer amp 572 can be connected to one of the wires that transmit video image data such as the red, green or blue video frames that are generated by the video graphics controller RAM 550. In this case, data would be transmitted over those wires during the blanking period when video data is not being transmitted from the host computer 10 to the display device 14. Alternatively, the output of buffer amp 572 can be connected to another connector in the video connector 16, such as the horizontal sync connector, or the vertical sync connector, or another connector that is not being used. If the horizontal or vertical sync connector is coupled to the output of buffer amp 572, data generated by data generator 570 can be transmitted during the trace period when the video graphics controller RAM is transmitting video data over the video connector 16.

As shown in the host computer 10 of FIG. 16, a buffer amp 576 is also connected to the video connector 16 for receipt of the dissimilar data that is being generated by data generator 570. In this case, buffer amp 576 is connected to the same wire or wires as the termination resistor 574 in the video connector 16 so that the buffer amp 576 receives the dissimilar data being generated by data generator 570. If the same wires for transmitting video data from the host computer 10 to the display device 14 are used for transmitting dissimilar data from display device 14 to host computer 10, termination resistor 556 functions to isolate the digital-to-analog converters 554 from the output of buffer amp 572. Alternatively, termination resistor 557 can be used in place of termination resistor 556, that is connected between the output of DAC 554 and a voltage reference if the DAC 554 has a current mode output. Similarly, a termination resistor 575 can be used, in place of a termination resistor 574 that is connected between the output of buffer amp 572 and a voltage reference if buffer amp 572 has a current mode output. The buffer amplifier 576 amplifies and buffers the dissimilar data received from the data generator 570 and transmits the dissimilar data to an analog-to-digital converter 578. The analog-to-digital converter 578 may constitute an analog decoder, such as analog decoder 558. The output 580 of the analog-to-digital converter is then transmitted to the micro-processor 582 for processing in the host computer 10. In this manner, dissimilar data can be transmitted to and from the host computer 10 and display device 14 via video connector 16 without the necessity for an additional cables.

The above description illustrates that correction factor data 28 or other dissimilar data may be read from the video graphics controller RAM by a host computer 10 and transmitted to a CRT device 12 along with video image data 26 over a video connector 16 for use in the synchronous alignment of the video image 22 to produce a substantially distortion free image upon CRT raster 24. The present invention, therefore, provides a novel and unique method and apparatus for using a host computer video graphic controller to store and transmit correction factor data or other dissimilar data over a video connector for use in the dynamic adjustment of video images on cathode ray tube (CRT) rasters or other functions. The necessary correction factor data can either be generated with a vision system, or gain matrix table, or manually generated by a technician using analog adjustments to monitor board circuitry. All that is necessary is that correction data, representative of the distortion characteristics, or other dissimilar data to be stored in the monitor or some other location and available to the host computer. Unlike prior methods of automated distortion correction, the present invention allows the use of the host computer's processor and memory, thus eliminating the need for a dedicated processor and memory in the CRT device. Additionally, techniques disclosed herein are utilized to transfer dissimilar data during the blanking time from the monitor back to the host computer. This data can constitute audio data or video data, such as from a video camera mounted on or within the monitor. Additionally, any other type of data that is desired to be transmitted from the monitor back to the host computer, such as data from a removable drive mounted in the display device, a keyboard, mouse or other device attached to the monitor could be transmitted in this fashion. Also, as described above, this data could be transmitted on separate lines at any time, and not just during the blanking period.

The foregoing description of the invention has been presented for purposes of illustration and description. It is not intended to be exhaustive or to limit the invention to the precise form disclosed, and other modifications may be possible in light of the above teachings. For example, any memory or storage residing in the host computer or a set top box could be used to store correction factor data that is transmitted to the CRT device via a video connector, in addition to the video graphics controller RAM residing in the video controller. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention, except insofar as limited by the prior art.

What is claimed is:

1. A method of combining correction data, representative of the distortional characteristics of a display device, with scaling data and video image data in a host computer and transmitting said correction data, said scaling data, and said video image data to said display device to generate correction signals for aligning a video image on said display device comprising the steps of:

storing said correction data, said scaling data and said video image data in video graphics RAM disposed in a host computer to produce a combined signal;

transmitting said combined signal from said host computer to said display device through a video connector coupled between said host computer and said display device so that said correction data and scaling data are temporarily located in predetermined time slots;

decoding said scaling data based upon its temporal location in said time slots to produce scaling factors;

decoding said correction data based on upon its temporal location in said time slots and said scaling factors to produce an analog correction signal; and generating correction signals in said display device from said analog correction signals to adjust said display device.

2. An apparatus for decoding correction factor data, that includes correction data addresses and correction data, for dynamically adjusting a video image on a display device comprising:

a first comparator that compares input signals representative of said correction data addresses with a predetermined threshold to produce a string of single address bits;

a first serial-to-parallel converter that transforms said string of single address bits into address words;

an address decoder that decodes said address words to generate enable signals; and a second comparator that compares input signals representative of said correction data with a predetermined threshold to produce a string of single correction data bits;

a second serial-to-parallel converter that transforms said string of single correction data bits to form correction data words;

correction and driver circuitry that generates correction control signals, in response to said address words and said correction data words, to adjust said video image on said display device.

3. A system for transferring dissimilar data between a host computer and a display device that eliminates the need for additional cables comprising:

at least one memory disposed in said host computer that stores video image data and said dissimilar data;

at least one decoder disposed in said display device that is capable of decoding said dissimilar data;

at least one data generator disposed in said display device that generates said dissimilar data for transmission from said display device to said host computer; and, a video connector coupled between said host computer and said display device that transmits said video image data and said dissimilar data that is stored in said at least one memory from said host computer to said display device, and that transmits said dissimilar data generated by said at least one data generator from said display device to said host computer.

4. The system of claim 3 wherein said at least one data generator comprises a video camera that generates video dissimilar data.

5. The system of claim 3 wherein said at least one data generator comprises a microphone that generates audio dissimilar data.

6. A system for transferring dissimilar data between a host computer and a display device that eliminates the need for additional cables, comprising:

at least one memory disposed in said host computer that stores video image data and said dissimilar data;

at least one decoder disposed in said display device that is capable of decoding said dissimilar data;

at least one data generator disposed in said display device that generates said dissimilar data for transmission from said display device to said host computer;

a video connector coupled between said host computer and said display device that transmits said video image data and said dissimilar data that is stored in said at least one memory from said host computer to said display device such that said video image data is transmitted over predetermined wires of said video connector during a trace period and said dissimilar data is transmitted over at least one of said predetermined wires during a blanking period, and that transmits said dissimilar data generated by said at least one data generator to said display device over at least one of said predetermined wires during said blanking period.

7. A method for decoding correction data, to generate driver signals for producing an aligned video image on a cathode ray tube monitor comprising the steps of:

routing said correction data to preselected channels in correction and driver circuitry;

generating a scaling factor by comparing said correction data with at least one reference voltage;

scaling said correction data using said scaling factor to produce an analog signal having a predetermined range of values;

generating driver signals in response to said analog signals to produce said aligned video image on said cathode ray tube monitor.

\* \* \* \* \*